United States Patent
Kapcia

(10) Patent No.: US 9,472,366 B2
(45) Date of Patent: Oct. 18, 2016

(54) GENERATION AND USE OF ELECTRIC FIELDS FROM CAPACITIVE EFFECTS OF A SOLENOID

(71) Applicant: Divergent, Inc., Novato, CA (US)

(72) Inventor: Jason Kapcia, Chicago, IL (US)

(73) Assignee: Divergent, Inc., Hillsboro, OR (US)

( * ) Notice: Subject to any disclaimer, the term of this patent is extended or adjusted under 35 U.S.C. 154(b) by 24 days.

(21) Appl. No.: 14/635,971

(22) Filed: Mar. 2, 2015

(65) Prior Publication Data

US 2015/0248982 A1  Sep. 3, 2015

Related U.S. Application Data

(60) Provisional application No. 61/947,342, filed on Mar. 3, 2014.

(51) Int. Cl.
| | |
|---|---|
| H01F 17/00 | (2006.01) |
| H01H 47/28 | (2006.01) |
| H01F 38/14 | (2006.01) |
| H02J 5/00 | (2016.01) |

(52) U.S. Cl.
CPC .............. *H01H 47/28* (2013.01); *H01F 38/14* (2013.01); *H02J 5/005* (2013.01)

(58) Field of Classification Search
CPC ........................................................ H01F 17/00
USPC ........................................................ 307/104
See application file for complete search history.

(56) References Cited

U.S. PATENT DOCUMENTS

| | | |
|---|---|---|
| 4,429,280 A | 1/1984 | Gelinas |
| 4,429,288 A | 1/1984 | Gelinas |
| 4,432,098 A | 2/1984 | Gelinas |
| 4,447,779 A | 5/1984 | Gelinas |
| 4,491,795 A | 1/1985 | Gelinas |

(Continued)

FOREIGN PATENT DOCUMENTS

| | | | |
|---|---|---|---|
| EP | 0050523 A2 | 4/1982 | |
| EP | 0920141 A2 * | 6/1999 | ............... H04B 5/00 |

(Continued)

OTHER PUBLICATIONS

International Search Report and Written Opinion mailed Jun. 3, 2015 in PCT/US2015/018312, 30 pages.

(Continued)

*Primary Examiner* — Rexford Barnie
*Assistant Examiner* — Joseph Inge
(74) *Attorney, Agent, or Firm* — Kilpatrick Townsend & Stockton LLP; David B. Raczkowski

(57) ABSTRACT

Systems, apparatuses, and methods are provided for producing a directional electric field from an end of the solenoid in an efficient manner. For example, voltage pulses can be used to charge the turns of the coil so that the coil acts as a capacitor. The voltage pulses can be of a specified time width (e.g., 1 μs or less) so as to reduce the amount of current flowing in the coil, and thus reduce the input power used in the coil. The electric field can be used for a variety of purposes, e.g., for charging or communication. An output conductor can be positioned such that electrons can be moved in the output conductor. The motion of electrons can correspond to the communication of data or be used to operate a load (e.g., in charging a device or otherwise providing power).

29 Claims, 15 Drawing Sheets

(56) References Cited

U.S. PATENT DOCUMENTS

| | | | |
|---|---|---|---|
| 4,605,897 A | | 8/1986 | Gelinas |
| 5,086,235 A | | 2/1992 | Marquet et al. |
| 5,684,678 A | | 11/1997 | Barrett |
| 5,845,220 A | | 12/1998 | Puthoff |
| 6,424,820 B1 | | 7/2002 | Burdick et al. |
| 8,024,692 B2 | | 9/2011 | Suaya |
| 8,120,207 B2 | | 2/2012 | Sanders et al. |
| 8,165,531 B2 | | 4/2012 | Nikolova et al. |
| 8,225,266 B2 | | 7/2012 | Suaya |
| 8,228,027 B2 | * | 7/2012 | Gao .................. H02J 7/025 320/108 |
| 8,389,948 B2 | | 3/2013 | Arman et al. |
| 2002/0149890 A1 | | 10/2002 | Kaneko et al. |
| 2005/0116683 A1 | | 6/2005 | Cheng et al. |
| 2006/0076338 A1 | * | 4/2006 | Kagan .................. H05B 6/04 219/201 |
| 2007/0242026 A1 | * | 10/2007 | Julian et al. .................. 345/100 |
| 2008/0087091 A1 | | 4/2008 | Shoureshi |
| 2009/0034657 A1 | * | 2/2009 | Nikolova .................. H01Q 1/26 375/316 |
| 2009/0243683 A1 | | 10/2009 | Ochi et al. |
| 2009/0251925 A1 | | 10/2009 | Usui et al. |
| 2010/0038971 A1 | | 2/2010 | Sanders et al. |
| 2010/0277003 A1 | | 11/2010 | Von Novak et al. |
| 2011/0121920 A1 | | 5/2011 | Kurs et al. |
| 2011/0127846 A1 | * | 6/2011 | Urano .................. H02J 5/005 307/104 |
| 2011/0199046 A1 | | 8/2011 | Tsai et al. |
| 2011/0225980 A1 | * | 9/2011 | Cheng .................. F25B 21/00 62/3.1 |
| 2012/0161538 A1 | * | 6/2012 | Kinoshita .............. H02J 17/00 307/104 |
| 2012/0299389 A1 | * | 11/2012 | Lee .................. H04B 5/0031 307/104 |
| 2012/0306282 A1 | | 12/2012 | Tan et al. |
| 2013/0005252 A1 | | 1/2013 | Lee et al. |
| 2013/0127257 A1 | * | 5/2013 | Yamamoto .............. H01F 38/14 307/104 |
| 2013/0214610 A1 | | 8/2013 | Tseng |
| 2013/0241304 A1 | | 9/2013 | Bae |
| 2013/0306282 A1 | | 11/2013 | Atkin |
| 2014/0159501 A1 | * | 6/2014 | Kanno .................. H02J 17/00 307/104 |
| 2014/0268895 A1 | | 9/2014 | Keeling |
| 2015/0001956 A1 | * | 1/2015 | Saen .................. H04B 5/0037 307/104 |
| 2015/0249359 A1 | * | 9/2015 | Gunderson .......... H02J 7/0047 320/108 |

FOREIGN PATENT DOCUMENTS

| | | | | |
|---|---|---|---|---|
| EP | 0920141 A3 | | 6/1999 | |
| JP | 0920141 A2 | * | 6/1999 | |
| JP | EP 0920141 A2 | * | 6/1999 | .......... H04B 5/0043 |
| JP | 11-331099 A | | 11/1999 | |
| WO | 98/31073 A2 | | 7/1998 | |

OTHER PUBLICATIONS

Office Action mailed Jun. 9, 2015 in U.S. Appl. No. 14/635,872, 12 pages.

Office Action mailed Jun. 2, 2015 in U.S. Appl. No. 14/635,984, 7 pages.

Bearden, T. E., "Engineering the Active Vacuum: On the Asymmetrical Aharonov-Bohm Effect and Magnetic Vector Potential A vs. Magnetic Field B:," [online], The Tom Bearden Website, 2006, [retrieved on Mar. 4, 2015], retrieved from the Internet: <URL: www.cheniere.org>, 28 pages.

Works, George, et al., "Confirmation Measurements of Vector Potential Waves," QEX, Jul./Aug. 2012, 5 pages.

"Aharonov-Bohm Effect and Magnetic Monopoles," [online], Oct. 24, 2011 course material, [retrieved on Mar. 4, 2015], retrieved from the Internet: <URL: bolvan.ph.utexas.edu/~vadim/Classes/11f/abm.pdf>, 12 pages.

Varma, Ram, K., "Observability of the effects of curl-free magnetic vector potential on the macroscale and the nature of the 'transition amplitude wave'" PRAMANA Journal of Physics, Apr. 2010, vol. 74, No. 4, pp. 491-511.

Shukla, P. K., "Curl-free vector potential observed at the macroscale," Physica Scriptia, 2012, vol. 86, 3 pages.

U.S. Appl. No. 14/635,872 (unpublished), filed Mar. 2, 2015, entitled, "Using Skin Effect to Produce a Magnetic Vector Potential for Inducing a Voltage," 67 pages.

U.S. Appl. No. 14/635,984 (unpublished), filed Mar. 2, 2015, entitled, "Wireless Power and Communication Systems Using Magnetic Vector Potential," 68 pages.

Office Action mailed Sep. 29, 2015 in U.S. Appl. No. 14/635,984, 8 pages.

\* cited by examiner

| Time(secs) | Voltage(C) | Current(C) | Voltage(R) | Voltage(L) | Current(R)(L) |
|---|---|---|---|---|---|
| 0 | 0 | 1000 | 0 | 100 | 0 |
| 0.0001 | 100 | 0 | 4.87697694 | 95.1197717 | 0.03251318 |
| 0.0002 | 100 | 0 | 9.51594628 | 90.4777098 | 0.063439642 |
| 0.0003 | 100 | 0 | 13.9285233 | 86.062191 | 0.092856822 |
| 0.0004 | 100 | 0 | 18.1257565 | 81.8621596 | 0.120838377 |
| 0.0005 | 100 | 0 | 22.1181552 | 77.8670994 | 0.147454368 |
| 0.0006 | 100 | 0 | 25.9157157 | 74.0670072 | 0.172771438 |
| 0.0007 | 100 | 0 | 29.5279465 | 70.4523682 | 0.196852977 |
| 0.0008 | 100 | 0 | 32.9638923 | 67.0141318 | 0.219759282 |
| 0.0009 | 100 | 0 | 36.232156 | 63.7436892 | 0.241547707 |
| 0.001 | 100 | 0 | 39.3409211 | 60.6328517 | 0.262272807 |
| 0.0011 | 100 | 0 | 42.2979713 | 57.6738301 | 0.281986475 |
| 0.0012 | 100 | 0 | 45.1107107 | 54.8592155 | 0.300738071 |
| 0.0013 | 100 | 0 | 47.786182 | 52.1819606 | 0.318574546 |
| 0.0014 | 100 | 0 | 50.3310841 | 49.6353618 | 0.335540561 |
| 0.0015 | 100 | 0 | 52.7517893 | 47.2130429 | 0.351678595 |
| 0.0016 | 100 | 0 | 55.0543585 | 44.9089386 | 0.367029057 |
| 0.0017 | 100 | 0 | 57.2445571 | 42.7172799 | 0.381630381 |
| 0.0018 | 100 | 0 | 59.327869 | 40.6325791 | 0.395519127 |
| 0.0019 | 100 | 0 | 61.3095105 | 38.6496165 | 0.40873007 |
| 0.002 | 100 | 0 | 63.1944434 | 36.763427 | 0.421296289 |
| 0.0021 | 100 | 0 | 64.9873872 | 34.9692878 | 0.433249248 |
| 0.0022 | 100 | 0 | 66.6928313 | 33.2627068 | 0.444618876 |
| 0.0023 | 100 | 0 | 68.3150459 | 31.6394108 | 0.455433639 |
| 0.0024 | 100 | 0 | 69.8580926 | 30.0953353 | 0.465720618 |
| 0.0025 | 100 | 0 | 71.3258352 | 28.6266142 | 0.475505568 |
| 0.0026 | 100 | 0 | 72.7219486 | 27.2295701 | 0.484812991 |
| 0.0027 | 100 | 0 | 74.0499284 | 25.9007049 | 0.49366619 |
| 0.0028 | 100 | 0 | 75.3130999 | 24.6366914 | 0.502087332 |
| 0.0029 | 100 | 0 | 76.5146256 | 23.4343646 | 0.510097504 |
| 0.003 | 100 | 0 | 77.6575142 | 22.2907142 | 0.517716761 |
| 0.0031 | 100 | 0 | 78.7446272 | 21.2028764 | 0.524964181 |
| 0.0032 | 100 | 0 | 79.7786866 | 20.1681277 | 0.53185791 |
| 0.0033 | 100 | 0 | 80.7622815 | 19.183877 | 0.53841521 |
| 0.0034 | 100 | 0 | 81.6978747 | 18.24766 | 0.544652498 |
| 0.0035 | 100 | 0 | 82.5878089 | 17.3571325 | 0.550585393 |
| 0.0036 | 100 | 0 | 83.4343123 | 16.5100649 | 0.556228748 |
| 0.0037 | 100 | 0 | 84.2395043 | 15.704336 | 0.561596696 |
| 0.0038 | 100 | 0 | 85.0054012 | 14.9379286 | 0.566702675 |
| 0.0039 | 100 | 0 | 85.7339205 | 14.2089235 | 0.57155947 |
| 0.004 | 100 | 0 | 86.4268864 | 13.5154956 | 0.576179243 |
| 0.0041 | 100 | 0 | 87.086034 | 12.8559086 | 0.58057356 |
| 0.0042 | 100 | 0 | 87.7130137 | 12.2285109 | 0.584753425 |
| 0.0043 | 100 | 0 | 88.3093954 | 11.6317317 | 0.588729303 |
| 0.0044 | 100 | 0 | 88.8766723 | 11.0640766 | 0.592511148 |
| 0.0045 | 100 | 0 | 89.4162647 | 10.5241244 | 0.596108432 |
| 0.0046 | 100 | 0 | 89.9295239 | 10.0105231 | 0.599530159 |
| 0.0047 | 100 | 0 | 90.4177348 | 9.52198675 | 0.602784898 |
| 0.0048 | 100 | 0 | 90.8821199 | 9.05729206 | 0.605880799 |
| 0.0049 | 100 | 0 | 91.3238419 | 8.61527554 | 0.608825613 |

FIG. 2C

| | | | | | |
|---|---|---|---|---|---|
| 0.005 | 100 | 0 | 91.7440069 | 8.19483042 | 0.611626713 |
| 0.0051 | 100 | 0 | 92.1436669 | 7.79490399 | 0.614291113 |
| 0.0052 | 100 | 0 | 92.5238226 | 7.41449489 | 0.616825484 |
| 0.0053 | 100 | 0 | 92.8854258 | 7.05265061 | 0.619236172 |
| 0.0054 | 100 | 0 | 93.2293819 | 6.70846516 | 0.621529213 |
| 0.0055 | 100 | 0 | 93.5565522 | 6.38107675 | 0.623710348 |
| 0.0056 | 100 | 0 | 93.8677559 | 6.06966564 | 0.625785039 |
| 0.0057 | 100 | 0 | 94.1637721 | 5.7734521 | 0.62775848 |
| 0.0058 | 100 | 0 | 94.445342 | 5.49169446 | 0.629635613 |
| 0.0059 | 100 | 0 | 94.7131707 | 5.22368723 | 0.631421138 |
| 0.006 | 100 | 0 | 94.9679287 | 4.96875937 | 0.633119524 |
| 0.0061 | 100 | 0 | 95.2102539 | 4.72627257 | 0.634735026 |
| 0.0062 | 100 | 0 | 95.4407531 | 4.49561968 | 0.636271688 |
| 0.0063 | 100 | 0 | 95.6600035 | 4.27622318 | 0.637733357 |
| 0.0064 | 100 | 0 | 95.8685539 | 4.06753373 | 0.639123693 |
| 0.0065 | 100 | 0 | 96.0669266 | 3.8690288 | 0.640446177 |
| 0.0066 | 100 | 0 | 96.2556182 | 3.68021136 | 0.641704122 |
| 0.0067 | 100 | 0 | 96.4351013 | 3.50060865 | 0.642900675 |
| 0.0068 | 100 | 0 | 96.6058252 | 3.32977095 | 0.644038834 |
| 0.0069 | 100 | 0 | 96.7682173 | 3.16727053 | 0.645121449 |
| 0.007 | 100 | 0 | 96.9226844 | 3.0127005 | 0.646151229 |
| 0.0071 | 100 | 0 | 97.0696131 | 2.86567384 | 0.647130754 |
| 0.0072 | 100 | 0 | 97.2093713 | 2.72582241 | 0.648062476 |
| 0.0073 | 100 | 0 | 97.3423091 | 2.59279606 | 0.648948727 |
| 0.0074 | 100 | 0 | 97.4687591 | 2.46626169 | 0.649791728 |
| 0.0075 | 100 | 0 | 97.5890381 | 2.34590249 | 0.650593588 |
| 0.0076 | 100 | 0 | 97.7034473 | 2.2314171 | 0.651356315 |
| 0.0077 | 100 | 0 | 97.812273 | 2.12251885 | 0.65208182 |
| 0.0078 | 100 | 0 | 97.9157877 | 2.01893508 | 0.652771918 |
| 0.0079 | 100 | 0 | 98.0142507 | 1.92040644 | 0.653428338 |
| 0.008 | 100 | 0 | 98.1079085 | 1.82668622 | 0.654052723 |
| 0.0081 | 100 | 0 | 98.1969956 | 1.73753977 | 0.654646637 |
| 0.0082 | 100 | 0 | 98.281735 | 1.65274386 | 0.655211567 |
| 0.0083 | 100 | 0 | 98.3623389 | 1.57208619 | 0.655748926 |
| 0.0084 | 100 | 0 | 98.4390092 | 1.49536479 | 0.656260061 |
| 0.0085 | 100 | 0 | 98.5119378 | 1.42238758 | 0.656746252 |
| 0.0086 | 100 | 0 | 98.5813073 | 1.35297182 | 0.657208715 |
| 0.0087 | 100 | 0 | 98.6472914 | 1.2869437 | 0.65764861 |
| 0.0088 | 100 | 0 | 98.7100554 | 1.22413791 | 0.658067036 |
| 0.0089 | 100 | 0 | 98.7697563 | 1.16439719 | 0.658465042 |
| 0.009 | 100 | 0 | 98.8265437 | 1.10757195 | 0.658843625 |
| 0.0091 | 100 | 0 | 98.8805597 | 1.05351991 | 0.659203731 |
| 0.0092 | 100 | 0 | 98.9319396 | 1.00210573 | 0.659546264 |
| 0.0093 | 100 | 0 | 98.9808121 | 0.95320069 | 0.659872081 |
| 0.0094 | 100 | 0 | 99.0272995 | 0.90668232 | 0.660181997 |
| 0.0095 | 100 | 0 | 99.0715182 | 0.86243415 | 0.660476788 |
| 0.0096 | 100 | 0 | 99.1135789 | 0.82034539 | 0.660757193 |
| 0.0097 | 100 | 0 | 99.1535869 | 0.78031067 | 0.661023913 |
| 0.0098 | 100 | 0 | 99.1916425 | 0.74222973 | 0.661277617 |
| 0.0099 | 100 | 0 | 99.2278409 | 0.70600722 | 0.661518939 |

FIG. 2D

DC current

Low frequency AC current

High frequency AC current

| Input Voltage | Output Voltage | | | | | |
|---|---|---|---|---|---|---|
| | 1us. pulse width, 50ns rise time | 750ns pulse width, 50ns rise time | 500ns pulse width, 30ns rise time | 250ns pulse width, 30ns rise time | 250ns pulse width, 21ns rise time | 150ns pulse width, 12ns rise time | 7.5ns pulse width, 3ns rise time |
| 1 | 0.33 | 0.42 | 0.72 | 0.78 | 2.42 | 4.87 | 15.92 |
| 75 | 20.71 | 18.71 | 32.46 | 25.87 | 35.06 | 32.19 | 37.08 |
| 150 | 41.02 | 46.96 | 64.2 | 55.91 | 61.79 | 61.14 | 61.65 |
| 225 | 61.63 | 57.95 | 77.26 | 75.64 | 99.6 | 102.75 | 110.93 |
| 300 | 72.8 | 70.72 | 101.04 | 99.34 | 128.22 | 115.81 | 146.2 |
| 375 | 119.75 | 120.44 | 145.63 | 166.63 | 160.91 | 145.69 | 161.42 |
| 450 | 147.27 | 123.99 | 171.01 | 158.08 | 185.88 | 160.7 | 231.99 |
| 525 | 139.56 | 163.84 | 197.12 | 232.42 | 215.29 | 190.04 | 271.64 |
| 600 | 154.68 | 144.42 | 233.95 | 216.63 | 230.73 | 228.48 | 351.48 |
| 675 | 172.56 | 180.09 | 268.52 | 242.11 | 357.53 | 319.13 | 568.05 |
| 750 | 235.85 | 244.72 | 310.48 | 307.17 | 404.5 | 417.95 | 747.52 |
| 825 | 271.08 | 267.9 | 361.16 | 333.36 | 634.08 | 698.78 | 786.09 |
| 900 | 298.16 | 283.04 | 370.42 | 341.47 | 1255.05 | 1339.06 | 2816.77 |
| 975 | 251.32 | 314.1 | 397.11 | 401.91 | 1326.07 | 1366.24 | 3092.12 |
| 1050 | 326.8 | 310.23 | 454.45 | 361.49 | 1491.74 | 1575.17 | 2725.22 |
| 1125 | 273.41 | 287.97 | 459.32 | 415.07 | 1592.46 | 1618.53 | 3021.41 |
| 1200 | 356.73 | 300.78 | 415.55 | 432.29 | 1691.68 | 1710.26 | 3333.48 |
| 1275 | 425.74 | 337.29 | 533 | 436.98 | 1717.77 | 1707.43 | 3165.69 |
| 1350 | 334.8 | 439.68 | 606.1 | 577 | 1942.52 | 1942.36 | 3335.55 |
| 1425 | 457.61 | 459.66 | 625.02 | 587.45 | 2002.57 | 1974.54 | 2962.46 |
| 1500 | 499.15 | 488.94 | 687.12 | 663.56 | 2056.57 | 2492.75 | 3248.18 |
| 1575 | 457.94 | 405.67 | 522.78 | 686.23 | 2228.41 | 2276.9 | 3548.87 |
| 1650 | 405.75 | 539.33 | 631.43 | 595.2 | 2469.83 | 2747.16 | 3698.77 |
| 1725 | 502.93 | 431.78 | 629.87 | 578 | 2480.22 | 2511.41 | 3879.12 |
| 1800 | 513.2 | 503.1 | 731.15 | 739.68 | 2618.28 | 2745.17 | 3754.11 |
| 1875 | 547.29 | 554.64 | 822.03 | 789.22 | 2678.98 | 3082.8 | 3693.03 |
| 1950 | 647.56 | 584.38 | 723.22 | 816.26 | 2744.44 | 3018.21 | 4710.32 |
| 2025 | 580.7 | 612.6 | 910.77 | 910.69 | 2822.36 | 3043.2 | 4407.26 |
| 2100 | 815.35 | 629.76 | 778.78 | 726.36 | 3068.92 | 3168.35 | 4347.58 |
| 2175 | 534.99 | 566.04 | 715.77 | 818.93 | 3249.66 | 3266.84 | 4684.24 |
| 2250 | 729.69 | 843.64 | 843.07 | 899.16 | 3401.89 | 3311.34 | 4578.6 |
| 2325 | 691.27 | 652.6 | 899.1 | 917.91 | 3354.53 | 3715.56 | 4732.59 |
| 2400 | 789.45 | 777.55 | 977.75 | 888.62 | 3478.63 | 3447.09 | 4558.63 |
| 2475 | 693.29 | 835.83 | 1121.43 | 1112.09 | 3441.45 | 3400.07 | 5053.78 |
| 2550 | 780.83 | 699.91 | 932.6 | 984.97 | 3737 | 3911.1 | 4824.35 |
| 2625 | 755.83 | 789 | 1196.59 | 907.7 | 3759.05 | 4094.8 | 5620.34 |
| 2700 | 744.57 | 795.93 | 1082.38 | 1075.31 | 4006.78 | 3847.61 | 4938.45 |
| 2775 | 827.99 | 883.68 | 1061.46 | 1063.03 | 3967.86 | 4273.5 | 6178.46 |
| 2850 | 690.33 | 705.56 | 1063.26 | 1198.5 | 4135.75 | 4232.6 | 5243.78 |
| 2925 | 740.64 | 697.11 | 969.45 | 931.62 | 4238.24 | 4400.97 | 6266.47 |
| 3000 | 730.69 | 719.09 | 1138.27 | 1019.48 | 4237.2 | 4435.65 | 6197.18 |
| 3075 | 817.18 | 835.83 | 1257.79 | 1007.95 | 4532.94 | 4651.91 | 5845.22 |
| 3150 | 794.53 | 962.56 | 1358.15 | 1112.09 | 4446.03 | 4765.51 | 5803.11 |
| 3225 | 778.09 | 1038.85 | 1205.77 | 1208.32 | 4533.12 | 4807.19 | 5887.87 |
| 3300 | 845.92 | 1033.74 | 1276.01 | 1250.5 | 4560.93 | 4812.39 | 6907.66 |
| 3375 | 803.29 | 1124.95 | 1468.47 | 1496.99 | 4830.66 | 5015.45 | 5995.09 |
| 3450 | 1105 | 1082.47 | 1431.3 | 1401.56 | 4919.36 | 5188.9 | 6754.26 |
| 3525 | 831.21 | 946.27 | 1419.19 | 1483.9 | 5093.67 | 5323.34 | 6197.88 |
| 3600 | 1203.22 | 973.66 | 1260.44 | 1528.69 | 5227.02 | 5583.27 | 6917.88 |
| 3675 | 999.38 | 996.19 | 1322.83 | 1302 | 5260.53 | 5659.74 | 7120.93 |
| 3750 | 880.17 | 1039 | 1285.79 | 1442.4 | 5213.63 | 5324.86 | 7445.29 |
| | | | | 1630.6 | | | 7647.04 |

GENERATION AND USE OF ELECTRIC FIELDS FROM CAPACITIVE EFFECTS OF A SOLENOID

CROSS-REFERENCES TO RELATED APPLICATIONS

The present application claims priority from and is a nonprovisional application of U.S. Provisional Application No. 61/947,342, entitled "Generation And Use Of Electric Fields From Capacitive Effects Of A Solenoid" filed Mar. 3, 2014, the entire contents of which are herein incorporated by reference for all purposes.

This application is also related to commonly owned U.S. Provisional Patent Application Nos. 61/947,334 and 61/947,343, the disclosures of which are incorporated by reference in its entirety. This application is also related to commonly owned and concurrently filed U.S. Nonprovisional patent applications entitled "Using Skin Effect To Produce A Magnetic Vector Potential For Inducing A Voltage" by Kapcia; and U.S. patent application entitled "Wireless Power And Communication Systems Using Magnetic Vector Potential" by Kapcia, the disclosures of which are incorporated by reference in its entirety.

BACKGROUND

Solenoids are typically used as electromechanical valves, e.g., by controlling current in the solenoid to move a magnet within the solenoid. Other types of solenoids can involve a movement of an object within the solenoid. Solenoids can be used in charging circuits, but often the device being charged is part of the same circuit as a solenoid.

For wireless charging, two solenoids are typically placed side-by-side around a two arms of a magnetic core (transformer) and driven with an alternating current. Or, two solenoids are situated with one on top of each other and driven with an alternating current. In either case, a Lenz effect is produced by such operation, which can result in electric fields that oppose current changes, thereby adding a load to the system and resulting in lower efficiency.

Therefore, it is desirable to provide improved systems, apparatuses, and methods for using coils in induction.

BRIEF SUMMARY

Embodiments provide systems, apparatuses, and methods for producing a directional electric field from an end of a coil in an efficient manner. For example, voltage pulses can be used to charge the turns of the coil so that the coil acts as a capacitor. The voltage pulses can be of a specified time width (e.g., 1 µs or less) so as to reduce the amount of current flowing in the coil, and thus reduce the input power used in the coil. The electric field can be used for a variety of purposes, e.g., for charging or communication. An output conductor can be positioned such that electrons can be moved in the output conductor. The motion of electrons can correspond to the communication of data or be used to operate a load (e.g., in charging a device or otherwise providing power).

A better understanding of the nature and advantages of embodiments of the present invention may be gained with reference to the following detailed description and the accompanying drawings.

BRIEF DESCRIPTION OF THE DRAWINGS

FIGS. 2C and 2D show a table 280 of the raw data for plot of FIG. 2A.

FIG. 14 shows a table 1400 of the data points used to create plots of FIGS. 13A and 13B according to embodiments of the present invention.

TERMS

As used herein, a "pulse" is different than a portion of a periodic, continuous signal. A pulse may have a beginning and ending that does not explicitly depend on other pulses, where as an AC waveform has a specific property throughout the waveform. A pulse would generally be positive or negative. After a pulse, the voltage decays back toward a steady-state value, e.g., toward ground. Thus, an alternating signal (e.g., sinusoidal wave) is not composed of pulses.

A "rise time" of a pulse is an amount of time for a pulse to increase from a first specified value to a second specified value. The first specified value being 10% or less of the amplitude, and the second specified value is 90% or more of the amplitude. The "amplitude" of a pulse is a maximum voltage achieved by a pulse. A "width" of a pulse corresponds to a time between a leading edge and a falling edge of a pulse. The width can be measured as the width at half of the amplitude, typically referred to as full width at half maximum (FWHM). In other examples, a width of ground to ground could be used.

A "conductor" refers to materials that conduct ions, e.g., electrons. Examples of conductors are metals, certain ceramic materials, and certain carbon structures.

DETAILED DESCRIPTION

This disclosure describes the use of short voltage pulses to charge an input coil to act as a stack of capacitors, thereby creating an electric field. The voltage pulses are of such a short duration (e.g., 1 μs or less) that current flow is kept at a minimal or essentially zero value, thereby minimizing power input. A switching mechanism is used to control the width of the voltage pulses. In one embodiment, an output conductor can be positioned such that a directional electric field from the input coil can be used to generate a current in the output conductor. For example, the output conductor can be a wire that runs along an axis of the input coil. In another embodiment, an output conductor can be an output coil that is positioned such that the directional electric field from the input coil can be used to charge the output coil. For example, the output coil can be aligned with the input coil.

I. Solenoid Model

A circuit model of an inductor is described to introduce aspects of an inductor, e.g., the capacitive properties of an inductor. A simulation of the model is then used to describe a voltage response of the resistive, capacitive, and inductive properties of an inductive coil (e.g., a solenoid) in the model circuit.

Figure 1:
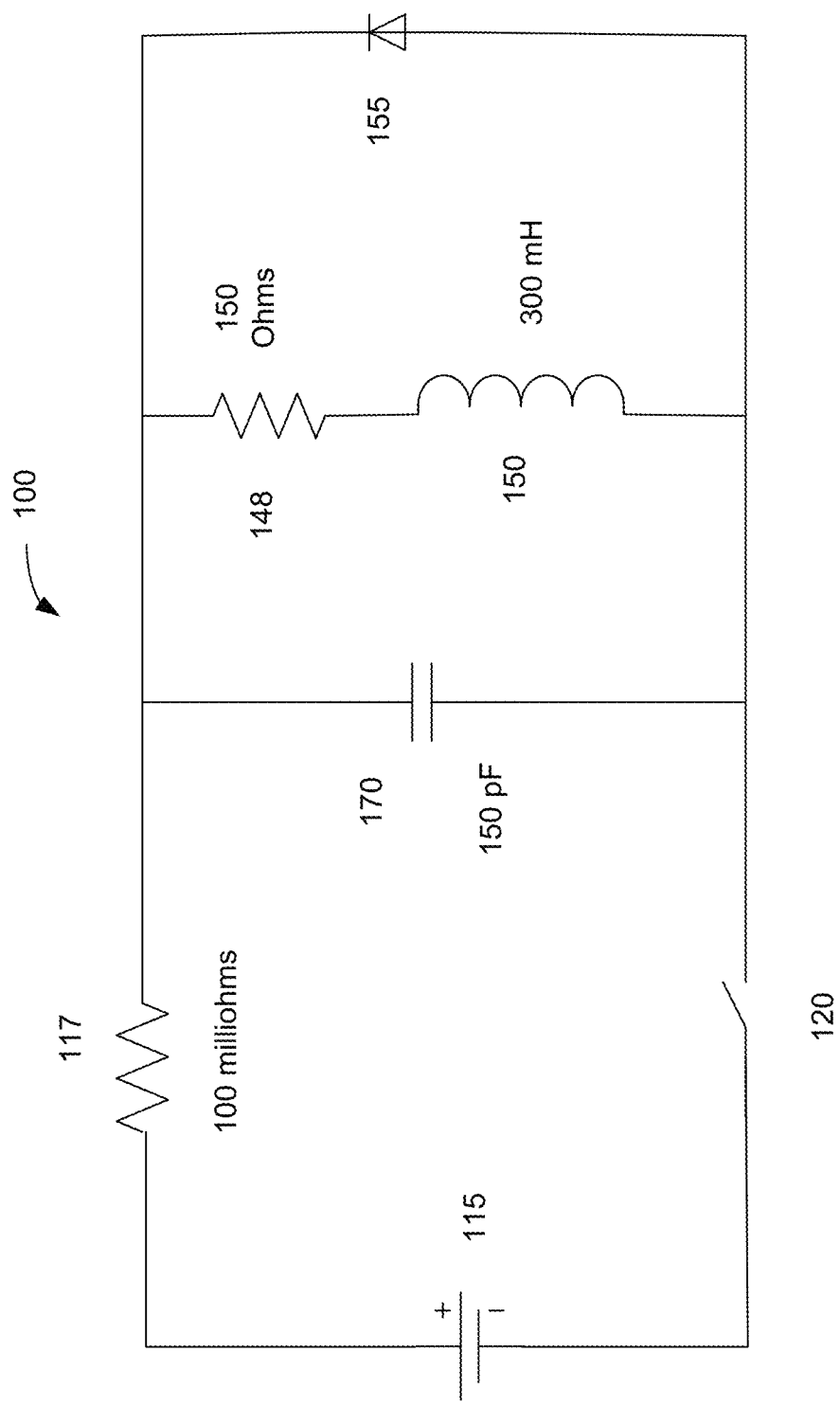
FIG. 1 shows a block diagram of a model circuit 100 of a solenoid.

FIG. 1 shows a block diagram of a model circuit 100 of a solenoid. The solenoid is modeled as being a combination of a resistor 148, an inductor 150, and a capacitor 170. Circuit 100 also includes a voltage source 115, a resistor 117 (e.g., corresponding to wire between voltage source 115 and the solenoid), and a switch 120. Resistor 117 can be set at 100 milliohms to account for a realistic resistance of wire between voltage source 115 and the solenoid. Examples values are 150 pF for capacitor 170, 150 Ohms for resistor 148, and 300 mH for inductor 150; such values are used in a simulation below.

Switch 120 can be controlled by a controller to open and close to provide voltage pulses to inductor 150. The voltage pulses can create a curl-free magnetic vector potential that is time-varying as described below. The voltage pulses can be of sufficiently short duration to reduce a total amount of current flowing in circuit 100.

A diode 155 is included in the model to prevent an inductive kickback, which could occur if there was too much current flowing in circuit 100. Without diode 155 and when voltage was applied to inductor 150 for too long, there could be a huge voltage that could destroy switch 120. If the voltage pulses are sufficiently short, the amount of current flowing is not a concern, and thus a diode is not needed in a real circuit using sufficiently short voltage pulses.

Regarding capacitor 170, an inductive coil can act as though it includes a parallel capacitor, because of its closely spaced windings. When a potential difference exists across the coil, wires lying adjacent to each other are at different potentials. Each winding corresponds to a plate of a capacitor.

Note that a single wire (i.e., not a coil) also has an inductance due to the skin effect, which is discussed in more detail below. The skin effect limits an amount of current while voltage is changing, as would occur in a rising edge of a voltage pulse. A coil has more inductance due to the windings. Thus, a coil would further limit an amount of current flow.

Figure 2A:
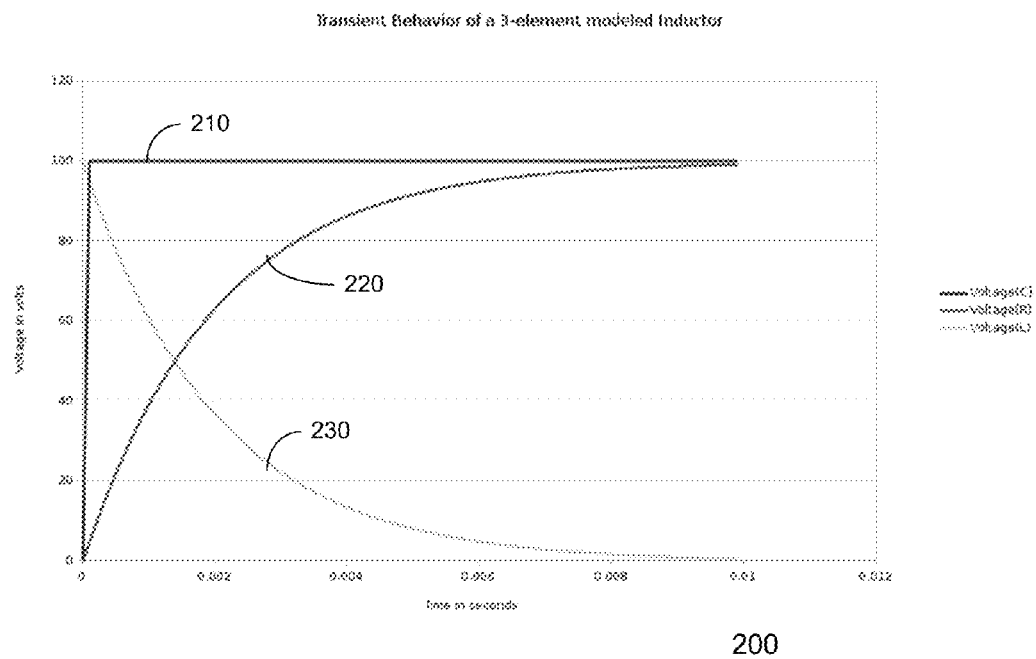
FIG. 2A shows a time dependence of voltage across capacitor 170, resistor 148, an inductor 150 when connected to a power supply 100 V.

FIG. 2A shows a time dependence plot 200 of voltage across capacitor 170, resistor 148, an inductor 150 when connected to a power supply 100 V. As one can see the voltage 210 across capacitor 170 increases rapidly from 0 to 100 V. The voltage 220 across resistor 148 increases in a logarithmic fashion over time. The voltage 230 across the inductor starts out at 100 V and decays as the current flows through the inductor. Thus, at time t=0, voltage 230 across inductor 150 is the applied voltage of the source.

As can be seen in plot 200, voltage 210 across capacitor 170 rises quickly compared to the increase in voltage 220 across resistor 148, where voltage 220 is proportional to current through resistor 148 in the path parallel to capacitor 170. This illustrates how much faster the capacitive effects of a coil occur compared to the increase in the current through the circuit. Embodiments utilize the fast action of the capacitive effects, and take advantage of the relatively slow action of the increase in current.

Figure 2B:
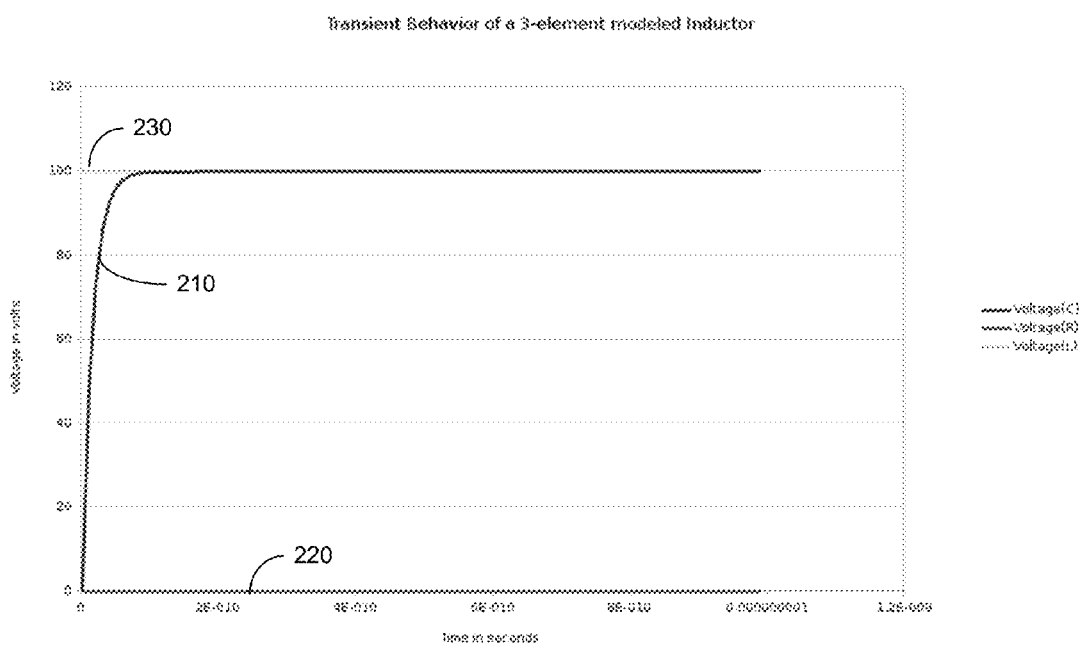
FIG. 2B shows a magnified view of FIG. 2A for a time frame of 1.2 nanoseconds.

FIG. 2B shows a magnified plot 250 of plot 200 for a time frame of 1.2 nanoseconds. In this regime, voltage 230 across inductor 150 is effectively constant at 100 V, and voltage 220 across resistor 148 is effectively zero, as no appreciable amount of current flows (i.e., using V=IR). Voltage 210 across capacitor 170 increases rapidly from 0 to 100 V as potential across the solenoid does not require current for charging.

In this simulation, the voltage is applied for at least 0.1 seconds. The decay of voltage 230 for inductor 150 is based on a time constant for circuit 100. For shorter pulses, the opening of switch 120 will cause voltage 230 across inductor 150 to be zero.

FIGS. 2C and 2D show a table 280 of the raw data for plot 200. In FIG. 2A, although it appears that inductor voltage 230 begins to decay before capacitor voltage 210 reaches 100 V, this is an artifact of the sampling voltages for plot 200 being larger than for plot 250.

II. Solenoid and Capacitance

As described above, a coil (e.g., a solenoid) can act like a capacitor. When the coil is driven with short voltage pulses, the capacitor is charged quickly, and the current is limited by the inductance of the coil.

A. Solenoid

Figure 3:
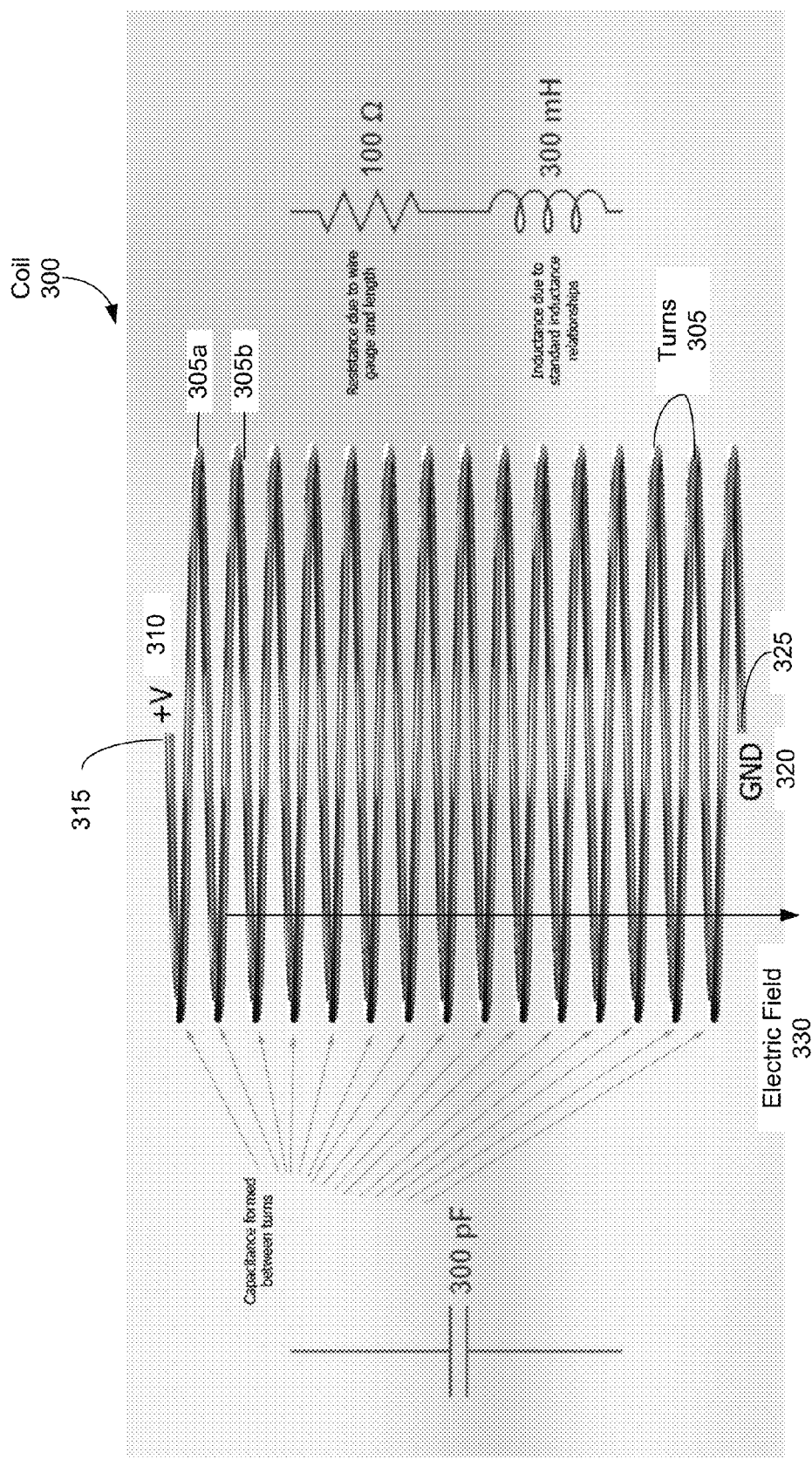
FIG. 3 shows a coil 300 composed of turns 305 according to embodiments of the present invention.

FIG. 3 shows a coil 300 composed of turns 305 according to embodiments of the present invention. A voltage 310 is applied at a first end 315 of coil 300. A second end 325 is at ground 320. Voltage 310 may be applied as a voltage pulse. At a particular instant in time, a certain voltage will be applied to first end 315, where voltage 310 increases during a rising edge of the voltage pulse and decreases during a falling edge of the voltage pulse. Second end 325 is at ground during the voltage pulse.

While voltage 310 is being applied, turns 305 (also called windings) of coil 300 act as a stack of capacitor plates. The voltage at each turn would decrease from voltage 310 at first end 315, where the last turn is at ground 320. For example, if voltage 310 is 100 V and there is 100 turns, each turn would decrease by 1 V.

The stack of capacitor plates cause an electric field 330 that is going down. As is seen from FIG. 2B, the capacitor charges very rapidly. Turns 305 are charged well before any current begins to flow. Further, with many turns, coil 300 has a higher resistance, which would also depend on the gauge of the wire. This higher resistance would act to further limit the speed at which current begins to flow. Further, the inductance of coil 300 can limit the current. In a time regime where no appreciable current has begun to the flow, coil 300 predominantly acts as a capacitor. As electric field 330 is directed at a particular direction, electric field 330 can be described as a directional electric field.

B. Charging

As a voltage pulse is applied to coil 300, the voltage between the turns of coil 300 will increase. The change in voltage across the turns of the coil would be instantaneous compared to the rise time of the voltage itself. Thus, the voltage difference across N turns will be the current voltage of the pulse divided by N. Thus, if after 1 ns, the voltage is at 100 V, then the voltage difference would be 1 volts when there is 100 turns. Accordingly, the increase in voltage over time will be larger for a turn that is closer to the high voltage and less for a turn near ground. For example, a first turn 305a might increase to 500 V and a second turn 305b only increase to 495 V (e.g., for 500 V pulse with 100 turns). Note that the voltage pulse is not transmitted along the coil (i.e., with a leading edge at some point in the coil and a falling edge at some point in the coil), but instead the coil is effectively subjected to a change in voltage at the same time.

III. Voltage Pulses

As described above, voltage pulses can be used so that the solenoid acts as a capacitor without causing appreciable current. Besides resistance in inductance of the coil, the current can be impeded due to eddy currents generated as the voltage increases during the pulse. These eddy currents are part of what is called the skin effect.

A. Skin Effect

Figure 4A:
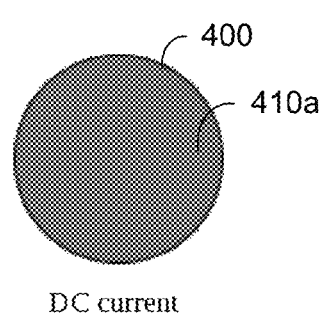
FIGS. 4A-4C provide cross-sectional views of a conductive wire 400 carrying different types of currents to illustrate the skin effect according to embodiments of the present invention.
Figure 4B:
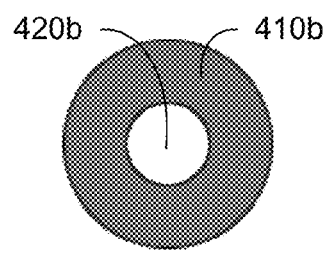
Figure 4C:
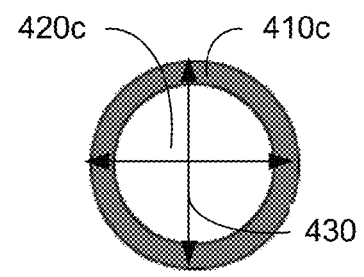

FIGS. 4A-4C provide cross-sectional views of a conductive wire 400 carrying different types of currents to illustrate the skin effect according to embodiments of the present invention. In FIG. 4A, the current remains constant and is DC. When the voltage is constant to provide a constant current, the current is composed of electrons moving along the wire throughout the entire wire. This is illustrated by the wire being completely shaded (region 410a), with shading indicating current flowing through the wire.

In FIG. 4B, the current changes moderately through time and is low frequency AC. The skin effect can be seen in FIG. 4B. Region 410b corresponds to where current can flow along wire 400. Region 420b corresponds to where no or minimal current is flowing along wire 400. The restriction of current to an outer ring of wire 400 when current is changing (i.e., AC character of current) is called the skin effect, so termed as the current stays near the skin (outer surface) of the wire.

In FIG. 4C, the current changes quickly through time and is high frequency AC. Region 410c corresponds to where current is flowing along wire 400. As one can see, region 410c is smaller than region 410a, as the frequency is higher for FIG. 4C. Region 420c corresponds to where no or minimal current is flowing along wire 400. Region 420c is larger than region 410b. The depth of the region through which current flows (i.e., 410b and 410c) is called the skin depth.

Besides a smaller region where current flows, the skin effect can cause electrons to move from the center of the wire outward to the surface of the wire, as is depicted by arrows 430. This motion will be discussed in more detail below.

Typically, the skin effect is viewed as a nuisance since the result is a smaller region through which current can flow. As the region for current flow is smaller, resistance increases. Thus, resistance varies inversely with the skin depth. Accordingly, standard techniques try to eliminate the skin depth. In contrast, embodiments can use the skin effect to limit current while still increasing the voltage on the coils.

Figure 5:
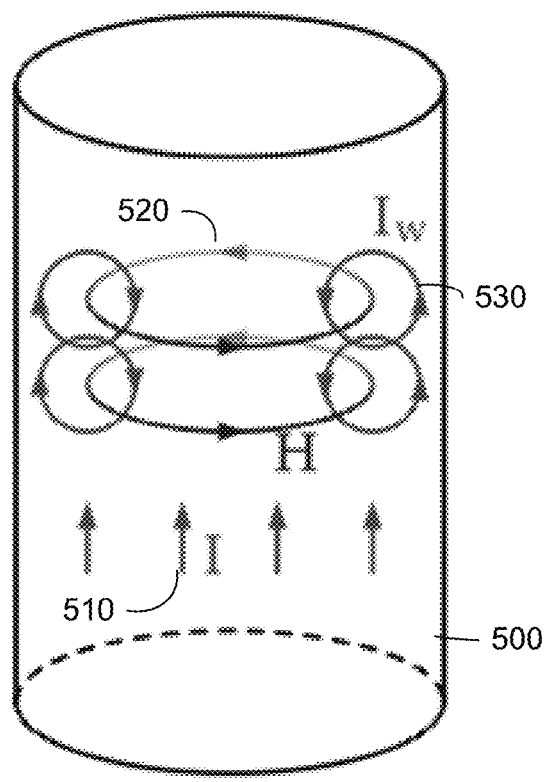
FIG. 5 illustrates eddy currents within a wire 500 that cause the skin effect. Wire 500 is shown with the current 510 (label I) in the up direction.

FIG. 5 illustrates eddy currents within a wire 500 that cause the skin effect. Wire 500 is shown with the current 510 (label I) in the up direction. Current 510 causes a magnetic field 520 (label H) to be generated within wire 500. As current 510 is time-varying, magnetic field 520 is also time varying, which generates an induced current 530 (labeled $I_W$). Induced current 530 (eddy currents) opposes current 510 toward the middle of wire 500, thereby causing no or minimal current to flow in the middle of wire 500.

The effect of induced current 530 decreases towards a surface of wire 500. Thus, the allowance of current flow at the surface. The higher the change (frequency) in current, the larger the induced current, and thus a smaller depth through which current will flow at the surface. Note that induced current 530 opposes an increase in magnetic field 520.

B. Movement of Electrons

During a rising edge of a voltage pulse, the voltage in the wire increases rapidly. This rapid increase in voltage causes a large dI/dt. Looking back at FIG. 5, the large dI/dt will cause a large dH/dt, which in turn leads to a large induced current 530. A large induced current can help to prevent an appreciable amount of current from flowing. And, induced current 530 causes electrons to flow toward the surface, as depicted by arrows of induced current 530 toward the surface. The induced current is less at the surface, and thus emf that would cause the electrons to move back toward the center is less than the emf pushing the electrons toward the surface. Accordingly, the more rapidly current changes through time, the more electrons diverge to the outer regions of the wire, as shown in FIGS. 4A-4C. This radial movement of electrons (radial current) can generate a time-varying magnetic vector potential in the radial direction, as is described in U.S. Provisional Application No. 61/947,334 and concurrently filed U.S. Nonprovisional application entitled "Using Skin Effect To Produce A Magnetic Vector Potential For Inducing A Voltage."

Figure 6C:
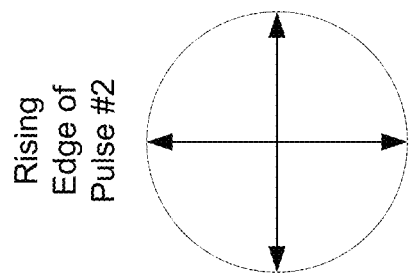
FIG. 6C shows a motion of electrons radially outward in a wire 600 during a rising edge of a second pulse.
Figure 6B:
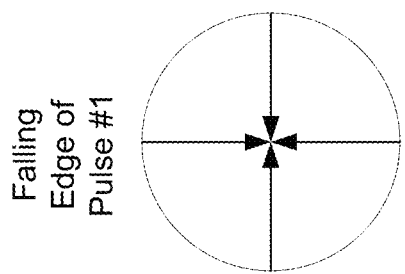
FIG. 6B shows a motion of electrons through the inward in wire 600 during a falling edge of the first pulse to a zero voltage.
Figure 6A:
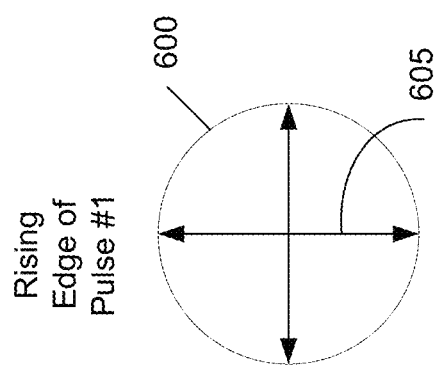
FIG. 6A shows a motion of electrons radially outward in a wire 600 during a rising edge of a first pulse.

FIG. 6A shows a motion of electrons radially outward in a wire 600 during a rising edge of a first pulse. During a rising edge, the large dI/dt causes a significant skin effect, which causes movement of electrons to the surface of wire 600. The radial outward motion is depicted with arrows 605. Thus, a radial current will exist toward the edge, thereby generating the radial outward $\vec{A}$.

FIG. 6B shows a motion of electrons inward in wire 600 during a falling edge of the first pulse to a zero voltage. At the end of the first pulse, the voltage is zero, and thus the change in current is zero. At the end of the first pulse, there is no skin effect as there is no voltage or current, which results in the electrons moving back to a state of equilibrium by some electrons moving towards the middle of wire 600. With the skin effect removed, the electrons are no longer being pushed toward the surface, which allows a movement towards the center that would be positively charged as a result of the radial movement during the rising edge.

FIG. 6C shows a motion of electrons radially outward in a wire 600 during a rising edge of a second pulse. Since the electrons had moved back towards the center after the end of the first pulse, the electrons can now move to the surface when the rising edge of the second pulse occurs. In this manner, a divergence from the center of the wire can be generated.

The slew rate (increase in voltage over time) relates to a frequency. Thus, the skin effect can be maximized by increasing the slew rate. A large voltage over a short period of time can be used to increase the slew rate, which can increase the magnetic vector potential that is created.

C. Reduction of Current

As described above, it is desirable to limit the amount of actual current along the wire, as such current causes a magnetic field that must be overcome. If the voltage pulse has sufficient properties (e.g., pulse width and rise time), the current never reaches an appreciable value because the current is increasing over a very short period of time. The voltage begins to decrease before an appreciable amount of current can flow, and thus a generation of an opposing magnetic field is avoided. Accordingly, the generation of a short voltage pulse is beneficial. A voltage pulse can be generated using a switching mechanism to obtain a short width for the pulse.

The properties of the rising edge can dictate an amount of radial movement of electrons, and thus an amplitude of the radial magnetic vector potential. The falling edge would be fast enough so that the voltage reaches zero (or a sufficiently small value) before a next voltage pulse is to be provided. The rate of the voltage pulses can be selected to provide an electric field with a desired property. A pulse width would limit maximum frequency of the voltage pulses.

The biggest change in current occurs between the time there is no current and when the current starts to flow. This is when dI/dt is highest. In an inductor (which all wires have some aspects of), dI/dt starts off at a maximum, and then exponentially decays to zero, if a constant current was ever achieved. Thus, the desirable high dI/dt can be achieved when I is at or near zero, which is also desirable. Further, the skin effect impedes the generation of current, as do other capacitive and inductive effects at the initial moment that voltage increases from zero. For instance, once the electrons begin to move, the electrons encounter eddy currents and a force that pushes the electrons to the surface. Thus, in the very short period of the rising edge of the pulse, an appreciable amount of current does not flow.

The reduction in current can also be thought of as occurring due to the opposing emf of the self-inductance of the wire: emf=−L×dI/dt. When there is a higher dI/dt, the opposing emf is larger. The pulses can provide a large dI/dt. Also, if the inductance is higher (e.g., in a solenoid), then the current can be reduced to a greater extent.

A purpose of having a short voltage pulse is to stop generation of current when the amount of current becomes appreciable. At that moment, the voltage pulse can stop, e.g., by opening a switch in the circuit. Thus, an appreciable magnetic field will not be generated. And, an appreciable amount of energy is not imparted to the inductor, which would otherwise provide a massive inductive kickback in the voltage. In this manner, the amount of energy used can be minimized. And, the use of pulses can continue to provide the dI/dt, without the ultimate power required once a current starts.

D. Properties of Pulses

The slew rate of a pulse is the amount of increase in voltage per unit time. To provide a large dI/dt, a high slew rate is desired. The high slew rate acts as a high frequency, which leads to an increased skin effect and a larger magnetic vector potential. Thus, a high slew rate can maximize the skin effect, which can also lead to greater efficiency (i.e., less appreciable current flowing along the wire). A low slew rate can allow a current to begin to build up within the wire. Similarly, a long rise time can allow a current to begin to build up.

In one embodiment, a rise time of less than 30 ns can provide a sufficient magnetic vector potential for transmitting communication signals and for charging, or otherwise powering a load. The amplitude and resulting slew rate can be specified to provide sufficient voltage to power a load in an output circuit (e.g., an output coil) that is positioned to use the electric field resulting from the divergent magnetic vector potential. In various embodiments, the slew rate can be equal to or greater than 1V/30 ns, 150 V/µs, 10 V/ns, 50 V/ns, or 100 V/ns.

The rising edge and falling edge of the voltage pulses can be asymmetric. For example, the rising edge can increase faster than the falling edge decreases. A slower change in voltage for the falling edge can reduce the magnetic vector potential generated on the falling edge, and thus reduce any electric field from the falling edge. The switching mechanism can be used to control the rising and falling edge of the voltage pulse, as a switch does not happen instantaneously. For example, an insulated-gate bipolar transistor (IGBT) can have a longer falling edge than rising edge.

Embodiments can strive to use pulses having as small a width as possible and/or as small of rise times as possible. In various embodiments, a maximum width of a pulse is less than 100 µs, 10 µs, 1 µs, 100 ns, 10 ns, and 1 ns. As explained above, a short pulse width can help to reduce the amount of current along the wire. The width can be sufficiently small that the resulting pulse is extremely narrow and triangular or Gaussian in nature (i.e., no or little time of being at a constant voltage at the top of the pulse). The pulse width would also impact the maximum frequency for the pulse rate.

To obtain a high and sustained slew rate, the total voltage achieved by the pulse would be high (e.g., 50 V). If the voltage was only 5 or 10 V, then the maximum voltage would be achieved in a time less than 1 µs, and current would begin to flow when the maximum voltage is reached and sustained (i.e., if the pulse width was not sufficiently small). Other embodiments can use higher voltage, such as 500 volts, 1,000 volts, or 10,000 volts. The higher voltage allows the slew rate to be maintained for a longer time, and thus affect the time dependence of A. Thus, the amplitude can contribute to achieving a maximum dI/dt, and increasing the generated electric field. The higher voltage can also create a larger electric field, depending on the number of turns in the coil.

Additionally, the higher amplitude of applied voltage can generate a higher slew rate in reaching the desired voltage, which can be less than the applied voltage. Typically, the pulse would reach the voltage of the power supply before a switch could open (i.e., cutting off the applied voltage). But, in some embodiments, the voltage in the wire may not reach the power supply voltage, but just reach a desired voltage, depending on the switching speed and the applied voltage.

Having the voltage of the power supply being larger than amplitude of the voltage pulses can provide a higher slew rate. For example, the initial increase from zero volts can be very large. As a voltage increases in the wire, the rate of increase would become smaller as the amplitude of the logical pulse nears the voltage of the power supply. Thus, to reach the voltage of the power supply, the slew rate would decrease, which would show up as a rounding of the amplitude of the pulse. And, the power supply would have to be connected for a longer time, which could result in an appreciable amount of current along the wire.

Thus, having a power supply with the maximum voltage higher than an amplitude of the voltage pulse can maximize the resulting magnetic vector potential and minimize the current along the wire, and the resulting magnetic field. The amplitude of voltage pulse would correspond to a length of time that the power supply is connected via a switching mechanism. The falling edge of the pulse would have a shape that is dictated by the switching mechanism that opens to end the pulse. Since a switch is not perfectly instantaneous, the falling edge would have a certain decay shape, and the rising edge of the pulse would have a certain rising shape. Once the switch is completely open (i.e., circuit is separated from the power supply), the voltage would be effectively zero in the circuit, depending on the decay rate and the time until a next pulse.

In some embodiments, an optimal value of a maximum pulse width is less than 1 µs (e.g., 50 ns, 1-5 ns, or less than 1 ns). Such a width cut can off the pulse before an appreciable amount of current can begin to flow. The pulse width can be controlled with a switching mechanism. This allows for the utilization of the generated dI/dt while minimizing I. Slew rates greater than 10 V/ns, 50 V/ns, or 100 V/ns can be used. Rise times can be less than 30 ns, 20 ns, 10 ns, 1 ns, or 500 picoseconds.

In some embodiments, the voltage of the power supply can be at least 50 V (e.g., when the divergent magnetic vector potential and resulting electric field are used for communications) or at least 150 V (e.g., when the divergent magnetic vector potential and resulting electric field are used for power generation). Power supplies can have voltage of 500 V or upwards of 1000 V and 1500 V. Even when using 32 gauge wire, the use of very short pulses would still not short the wire as an appreciable amount (e.g., less than 50 micro amps or less than 1-3 milliamps) of current does not flow.

E. Radial Magnetic Vector Potential A

Figure 7A:
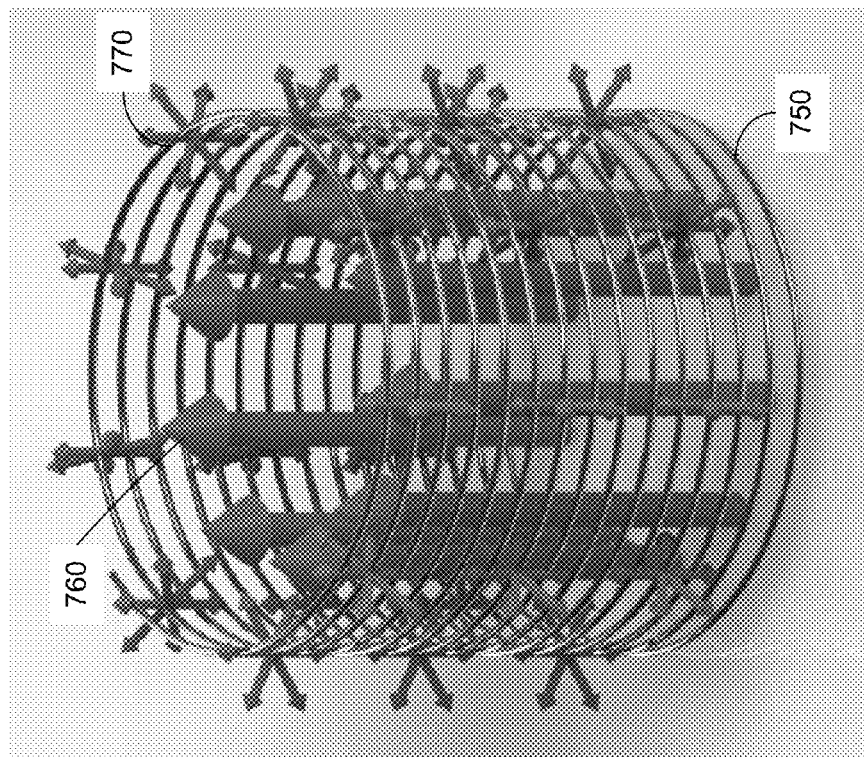
FIG. 7A shows a solenoid 700 from which a radial magnetic vector potential 710 is produced according to embodiments of the present invention.

FIG. 7A shows a solenoid 700 from which a radial magnetic vector potential 710 is produced according to embodiments of the present invention. Magnetic vector potential 710 is shown radially emanating from various points on the coil of solenoid 700. Magnetic vector potential 710 can be produced, as described above, by applying voltage pulses.

Magnetic vector potential 710 from windings that are next to each other can cancel out in some directions, as the magnetic vector potential 710 is produced in all directions. For example, arrow 714 points down and arrow 712 points up. For points on windings that are just above and below each other, the magnetic vector potential in the vertical direction (i.e., up and down) would be at substantially the same strength, and thus cancel each other out.

Further, arrows 716 and 718 can cancel each other out in the vertical direction, leaving only a horizontal component. Accordingly, the resulting magnetic vector potential at points radially distal from the coil can be solely in the horizontal direction. For example, a point in a plane that bisects the cylindrical solenoid can have components of magnetic vector potential 710 only in the horizontal direction.

Points in planes that are further up or down from the bisecting plane can have components of magnetic vector potential 710 in the vertical direction as such a plane would be offset from the middle, and thus more lines of magnetic vector potential 710 would be received in the direction of the offset. For example, a first point near the top of solenoid 700 would have more lines of magnetic vector potential 710 reach it from points below the first point. Thus, there would be some electric field in the up direction.

Points that are directly above a top winding 720, would have a vertical component to magnetic vector potential 710, as there is no canceling component from another winding. As mentioned above, the slew rate of the pulse and the pulse rate can cause magnetic vector potential 710 to vary in time, which can result in an electric field according to $$\vec{E} = -\frac{\partial \vec{A}}{\partial t}.$$

Magnetic vector potential 710 can be considered to be longitudinal if it does not have a curl. Also, magnetic vector potential 710 is not part of a transverse wave of coupled electric and magnetic fields. The magnetic vector potential varies in a direction of propagation of the magnetic vector potential. The longitudinal wave increases and decreases in correspondence to voltage pulses, where $\vec{A}$ decreases to zero between pulses. Accordingly, the radial expansion of electrons in a wire can induce a longitudinal wave in magnetic vector potential.

A time variance of the electric field can be dictated by second and higher derivatives in the $\vec{A}$ generated during a rise time of the voltage pulse. The electric field has a same direction or opposite direction, depending on how $\vec{A}$ is changing over time (e.g., increasing or decreasing). For example, if $\vec{A}$ is increasing over time, then the electric field would be in the opposite direction. If $\vec{A}$ is decreasing over time, then the electric field would be in the same direction. And, the pattern of pulses can determine a time variance of the electric field. For example, pulses can be sent in bursts, followed by no pulses for a specified duration, thereby providing a time variation of the electric field.

The oscillation of the magnetic vector potential can be controlled to provide a desired electric field, which can be used for a variety of purposes (e.g., inductive charging and communications). For example, the slew rate of the voltage pulses can be used to determine an instantaneous magnitude of the electric field, and the duration of the rise time can correspond to an amount of time that an electric field is generated. Further, the duty cycle of pulses can be used to control an average magnitude of the resulting electric field. As the benefit is obtain in the edges of the pulse, the width of the pulse can be kept small so that current does not flow in the input circuit (conductor). In various embodiments, a duty cycle of 20%, 10%, 5%, 1%, 0.5%, 0.1%, or less can be used.

IV. Electric Fields

The use of high voltage pulses of short rise time (e.g., less than 30 ns) with a solenoid can generate a substantial electric field along the axis of the solenoid. And, such pulses may not generate a substantial current in the solenoid when a pulse width is of short duration (e.g., 1 µs). This operation is now contrasted with a standard operation of a solenoid.

A. Standard Operation

Figure 8B:
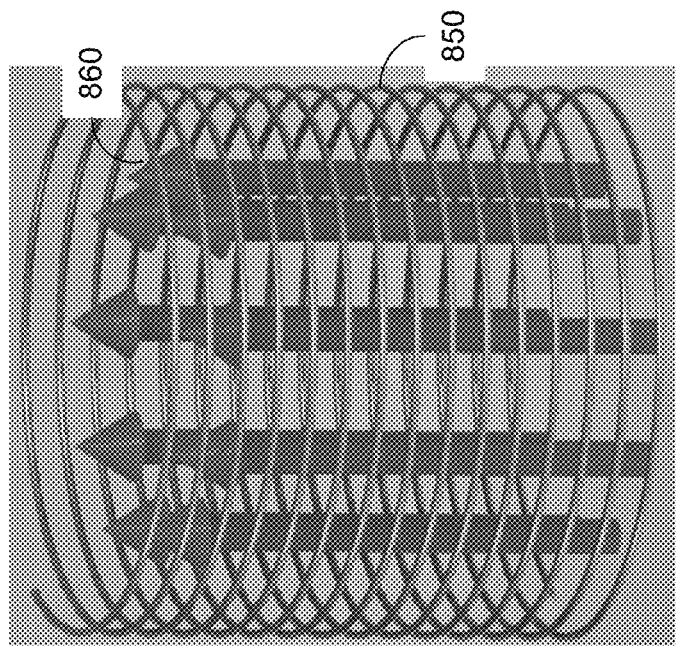
FIG. 8B shows a solenoid 850 to which voltage pulses are being applied.
Figure 8A:
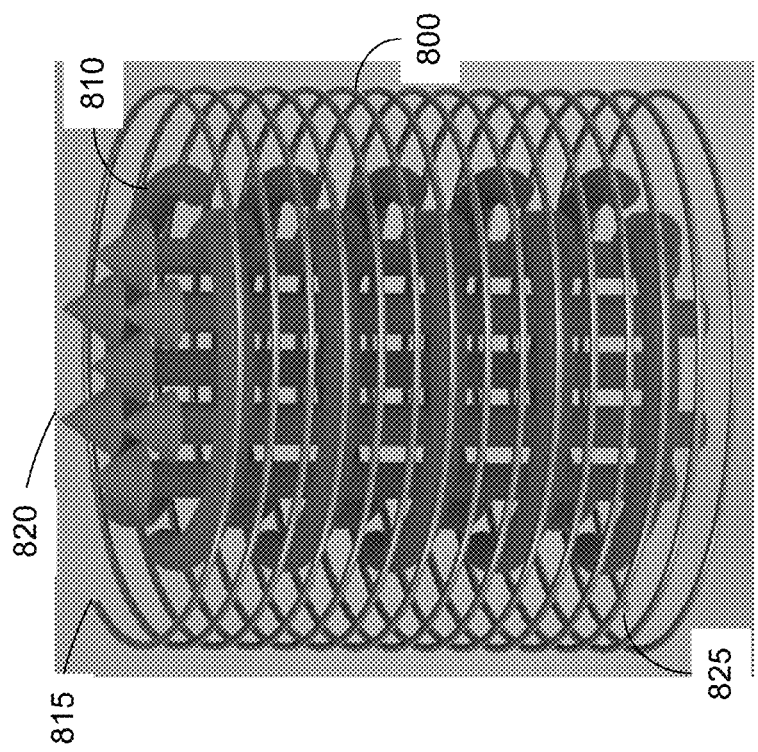
FIG. 8A shows a solenoid 800 through which a current is flowing per a standard operation of solenoid 800.

FIG. 8A shows a solenoid 800 through which a current is flowing per a standard operation of solenoid 800. When current is flowing through solenoid 800, a magnetic field is created in the center of the solenoid. As shown, current is flowing from a top end 815 to a bottom end 825. Thus, the current is flowing in a counterclockwise direction. The resulting magnetic field 820 is in the up direction.

If the current changes, the magnitude of the magnetic field will also change. This change in the magnetic field will induce an electric field that opposes the change in the current, according to:

$$-\frac{\partial \vec{B}}{\partial t} = \nabla \times \vec{E}.$$

As shown, electric field 810 is counterclockwise and is the result of the current decreasing, while still being in the clockwise direction. Thus, the clockwise direction of electric field 810 opposes the decrease and is oriented to try to keep the current the same. Thus, electric field 810 would induce a current that is also clockwise. Ultimately, as the current continues to decrease, electric field 810 cannot induce a large enough current to stop the change in current.

B. Operation with Pulses

FIG. 8B shows a solenoid 850 to which voltage pulses are being applied. As short voltage pulses are being used, no appreciable amount of current is flowing. Thus, solenoid 850 is operating solely as a capacitor. Since no appreciable amount of current is flowing, a magnetic field would not be generated, and thus one is not shown. The strength of the electric field depends on the voltage difference between the turns (windings) according to $\vec{E}=-\nabla\phi$, where $\phi$ is the voltage, also called electric potential.

The voltage difference between the windings increases as the voltage of a pulse increases. For example, when the voltage is 1/10 the maximum voltage attained by a voltage pulse, the difference between two windings would be 1/10 the difference attained at the maximum voltage, and the electric field would be 1/10 the strength at the maximum voltage.

C. Comparison of Standard Vs. Pulses

In the standard operation of solenoid 800 (as depicted in FIG. 8A), a different potential would exist on the different turns. However, such a directional electric field would be relatively small. Since the intended operation of solenoid 800 is to have current flowing, the applied voltage is not substantial (e.g., about 5 V for alternating current). Thus, the overall difference in voltage between the turns is small, and the electric field is small. If many turns are used and DC voltage is used, then voltages as high as 120 V for direct current can be used. But, since many turns are used, the voltage difference between any two turns is relatively small, and the electric is small.

Also, more energy is used in the standard operation due to the flow current. In contrast, for the operation depicted in FIG. 5B, the voltage is higher as the amount of current and power used is less of a concern. Also, electric field 810 can interfere with electric field 860 as discussed in more detail below.

D. Comparison of Skin Effects and Capacitive Effects

Figure 7B:
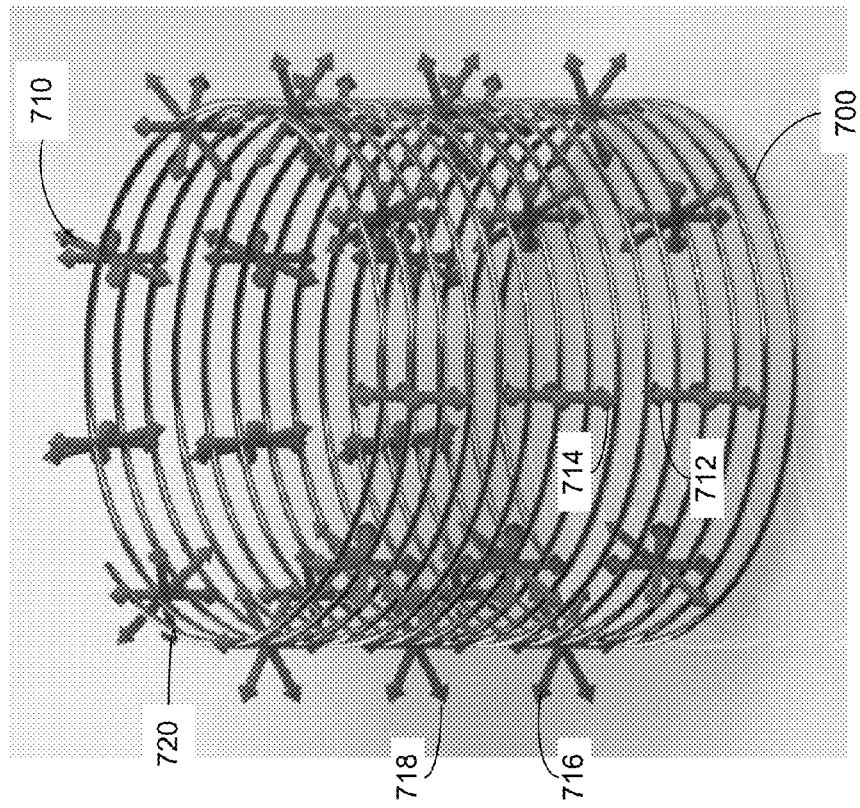
FIG. 7B shows a solenoid 750 from which a radial magnetic vector potential 770 and an electric field 760 are produced according to embodiments of the present invention.

FIG. 7B shows a solenoid 750 from which a radial magnetic vector potential 770 and an electric field 760 are produced according to embodiments of the present invention. As mentioned above, the slew rate of the pulse (e.g., as defined by amplitude and rise time) and the pulse rate can cause magnetic vector potential 770 to increase in time. At a point above solenoid 750, the resulting electric field during an increase in $\vec{A}$ would cause a downward electric field $\vec{E}$ according to $$\vec{E} = -\frac{\partial \vec{A}}{\partial t}.$$

Electric field 760 can be larger than the electric field resulting from a time variance of radial magnetic vector potential 770, at least for certain rise times. For example, when a pulse begins, the overall voltage is small, and thus electric field 760 would be small. If the pulse can increase in voltage fast enough, the time derivative of $\vec{A}$ could possibly be larger than the electric field 760 at that time. But, as the voltage applied becomes larger, electric field 760 would become larger, and can become larger than the time derivative of $\vec{A}$ at some time.

V. Use with Output Coil

Figure 9:
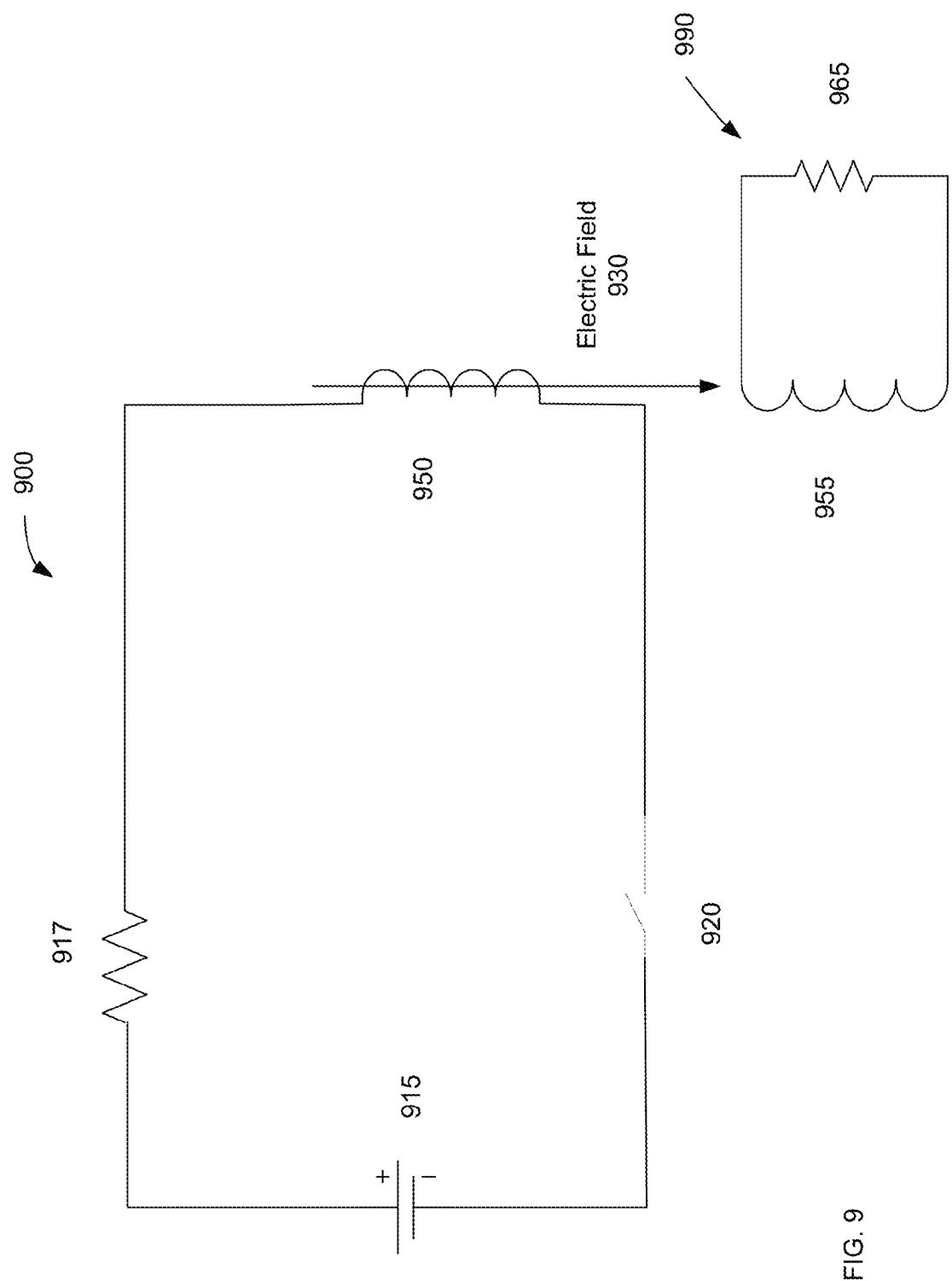
FIG. 9 shows a block diagram of a circuit 900 with a solenoid 950 producing an electric filed 930 that causes a current in circuit 990 according to embodiments of the present invention.

FIG. 9 shows a block diagram of a circuit 900 with a solenoid 950 producing an electric field 930 that causes a current in circuit 990 according to embodiments of the present invention. The block diagram can correspond to an apparatus according to embodiments of the present invention. Circuit 900 includes a voltage source 915, a resistor 917, a solenoid 950 (e.g., a cylindrical solenoid), and a switch 920. Switch 920 can be controlled by a controller to open and close to provide voltage pulses to inductor 950. Resistor 917 can represent resistance in a wire between voltage source 915 and inductor 950. The voltage pulses can create a curl-free magnetic vector potential as described herein. Accordingly, embodiments can provide a method of generating a curl-free magnetic vector potential for inducing an output voltage in an output circuit.

Switch 920 can be composed of many components use various techniques for providing the voltage pulse, such techniques include magnetic pulse compression, MOSFET switched capacitors, and using a junction recovery diode. Various types of a solid-state switch can be used.

Electric field 930 can be used to induce current in a separate circuit 990, without limiting effects of the magnetic field that would normally be created by a magnetic vector potential that had a curl. Circuit 990 can include another inductor 955 or any load to be driven. Circuit 990 can also include a storage device, such as a capacitor bank. Solenoid 950 is called an input coil and inductor 955 corresponds to an output conductor, which may comprise any load, such as a wire. For example, a load 965 can be connected to inductor 955 in circuit 990 (an example of an output circuit). In various embodiments, load 965 can be circuitry of a consumer device and may include a processor, sensors, etc.

In some embodiments, the output circuit includes a first output coil in the plane of the input circuit (e.g., in input conductor or an input coil). The output coil can include first windings lying in the plane to one end of the cylindrical solenoid such that a first axis of the output coil is aligned with the cylindrical solenoid, e.g., the output coil is parallel or has a component parallel to a second axis of an input solenoid. The output coil can be a first cylindrical solenoid and the input coil can be a second cylindrical solenoid.

A. Solenoid with Output Wire

Figure 10B:
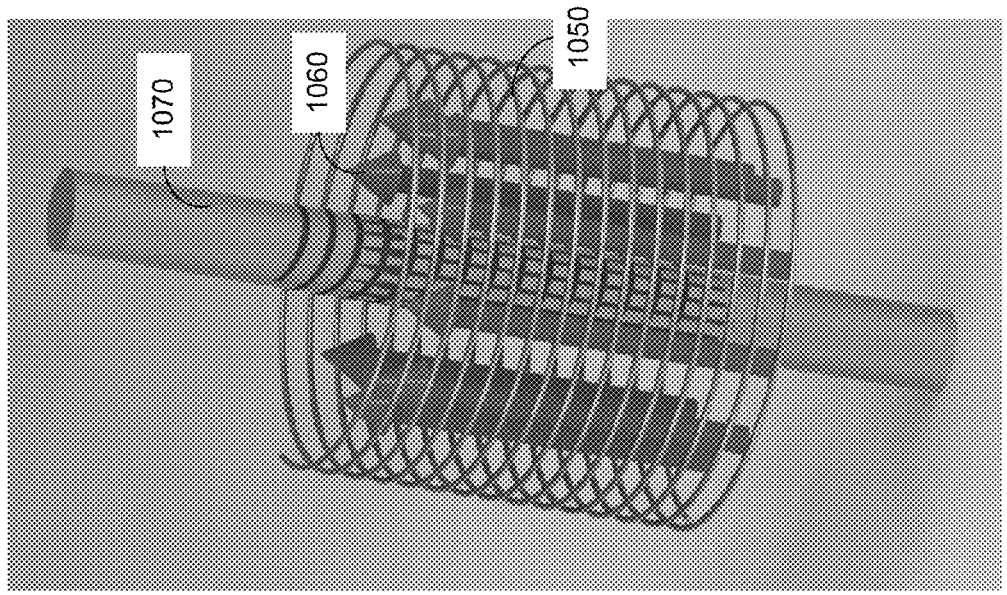
FIG. 10B shows a wireless interaction between an input solenoid 1050 to which voltage pulses are being applied and an output wire 1070 according to embodiments of the present invention.
Figure 10A:
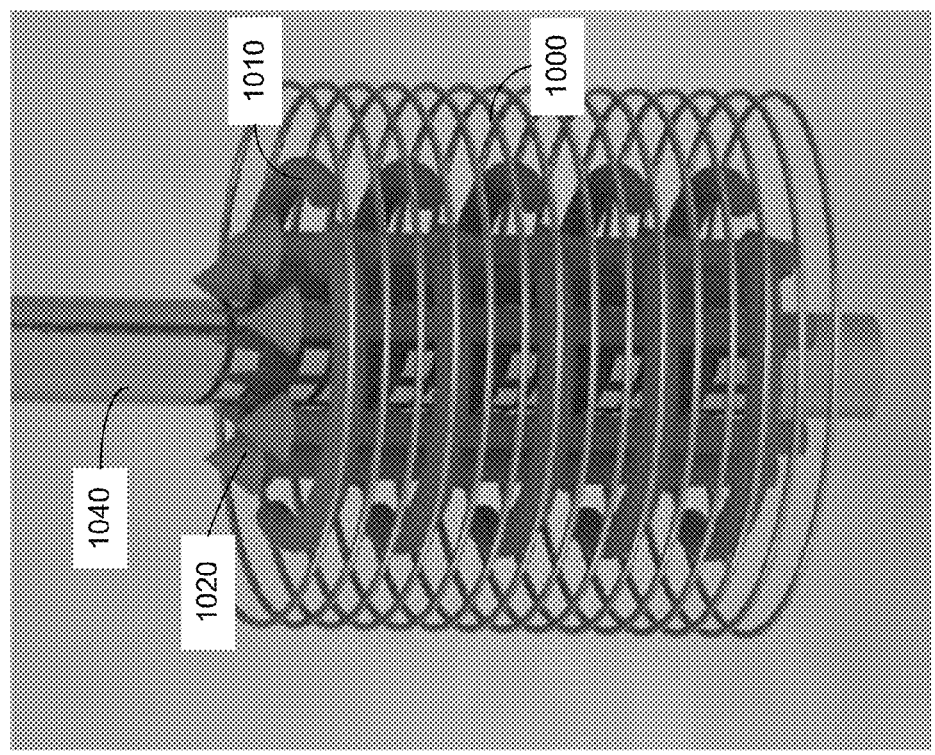
FIG. 10A shows a wireless interaction between a solenoid 1000 through which a current is flowing per a standard operation of solenoid 1000 and a wire 1040.

FIG. 10A shows a wireless interaction between a solenoid 1000 through which a current is flowing per a standard operation of solenoid 1000 and a wire 1040. As with FIG. 8A, current is flowing in a counterclockwise direction, thereby generating a magnetic field 1020. At the time depicted, the current is decreasing, and thus electric field 1010 resulting from the change in the magnetic field 1020 opposes the decrease in the current.

Electric field 1010 produced by the standard operation of the solenoid does not align with the length of the output wire/conductor, such that no electric field would be produced down the length of the wire and hence no current would flow. Electric field 1010 can interact with wire 1040. But, the electric field would simply cause circular currents that are tangential to the surface of wire 1040. Such tangential currents do not flow along the wire, and thus cannot be used to drive a load.

FIG. 10B shows a wireless interaction between an input solenoid 1050 to which voltage pulses are being applied and an output wire 1070 according to embodiments of the present invention. Specifically, FIG. 10B shows output wire 1070 partially inside input solenoid 1050. As input solenoid 1050 is being driven by short voltage pulses, no appreciable current and resulting magnetic field is occurring. Electric field 1060 is shown directed along an axis of solenoid 1050 in a direction that is generally upward. Output wire 1070 is positioned to receive directional electric field 1060. Output wire 1070 is shown partially within the input solenoid 1050, but all of it can be within solenoid 1050, with other connection leading to a load.

Output wire 1070 has an orientation that makes it parallel with electric field 1060, and thus the electric field lines are along output wire 1070. Thus, a current can be generated along output wire 1070, and such a current can be used to drive a load that is electrically connected to wire 1070. Additionally, a radial magnetic vector potential is produced, as shown in FIG. 7B.

B. Solenoid with Output Coil

Figure 11B:
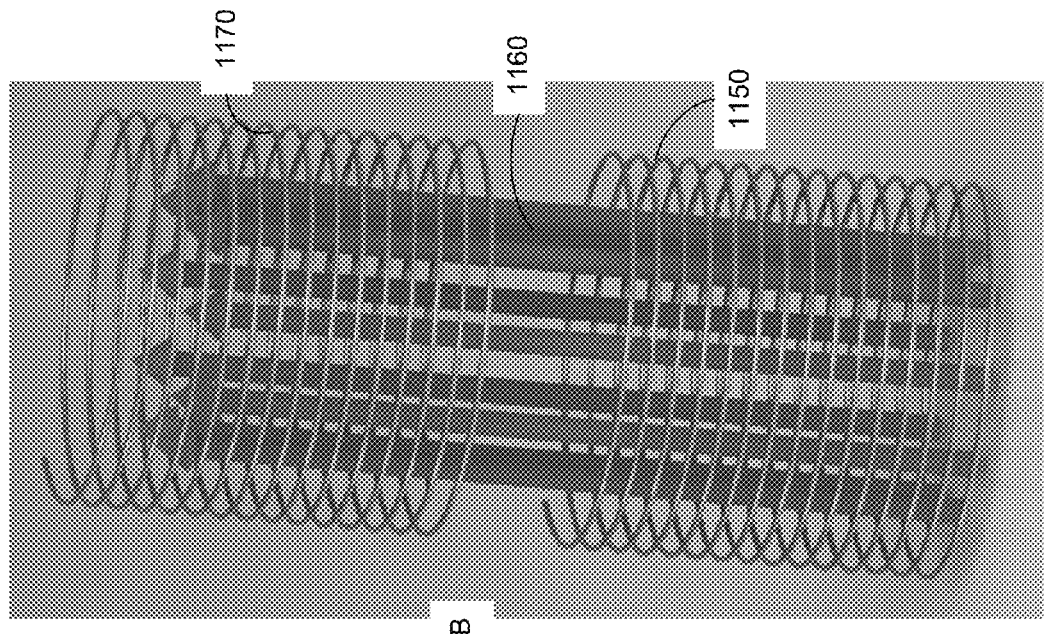
FIG. 11B shows a wireless interaction between an input solenoid 1150 to which voltage pulses are being applied and an output coil 1170 according to embodiments of the present invention.
Figure 11A:
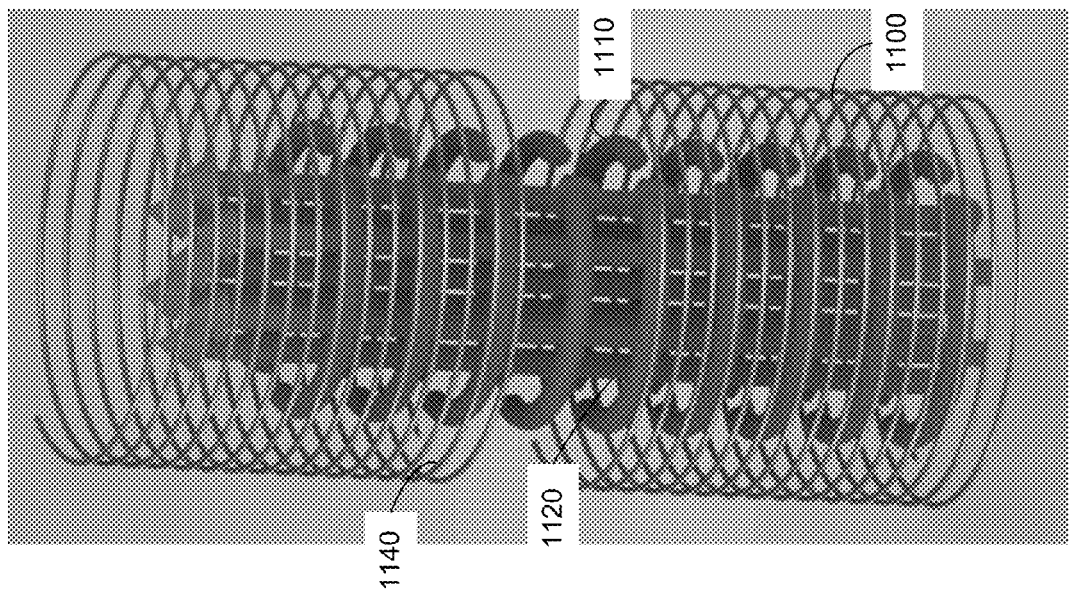
FIG. 11A shows a wireless interaction between a solenoid 1100 through which a current is flowing per a standard operation of solenoid 1100 and a coil 1140.

FIG. 11A shows a wireless interaction between a solenoid 1100 through which a current is flowing per a standard operation of solenoid 1100 and a coil 1140. As with FIG. 10A, current is flowing in a counterclockwise direction, thereby generating a magnetic field 1120. At the time depicted, the current is decreasing, and thus electric field 1110 resulting from the change in the magnetic field 1120 opposes the decrease in the current. Electric field 1110 aligns with the wires that make up coil 1140 such that there would be an electric field produced down the length of the wires that constitute output coil 1140, and no current would flow unless a load was attached.

Electric field 1110 can interact with coil 1140 to form a current in the counterclockwise direction when a load is attached. When the current in solenoid 1100 is in the clockwise direction and decreasing, the current in coil 1140 would change to be in a clockwise direction. Thus, the induced current would be AC. As the current is AC, there would be limiting effects due to a time-varying magnetic field results from the current induced in coil 1140. Thus, energy would be lost in both solenoid 1100 and coil 1140 to opposing currents resulting from the time-varying magnetic field generated by the original current.

FIG. 11B shows a wireless interaction between an input solenoid 1150 to which voltage pulses are being applied and an output coil 1170 according to embodiments of the present invention. As input solenoid 1150 is being driven by short voltage pulses, no appreciable current or resulting magnetic field is occurring. Electric field 1160 is shown directed along an axis of solenoid 1150 in a direction that is generally upward.

Output coil 1170 is in an orientation that is aligned with electric field 1160. Electric field 1160 can cause output coil 1170 to have different voltages on its turns, e.g., higher voltage on turns closer to input solenoid 1150. Thus, electric field 1160 can cause output coil 1170 to act like a capacitor as well.

Also, a current is generated in output coil 1170 if a load was connected to output coil 1170, and such a current can be used to drive the load that is electrically connected to output coil 1170. The current in output coil 1170 is in a clockwise direction, given the windings of output coil 1170 and as the current flows from bottom to top. The current would vary as the strength of electric field 1160 varies, as occurs when the voltage pulse increases and decreases.

VI. System

A. Block Diagram

Figure 12:
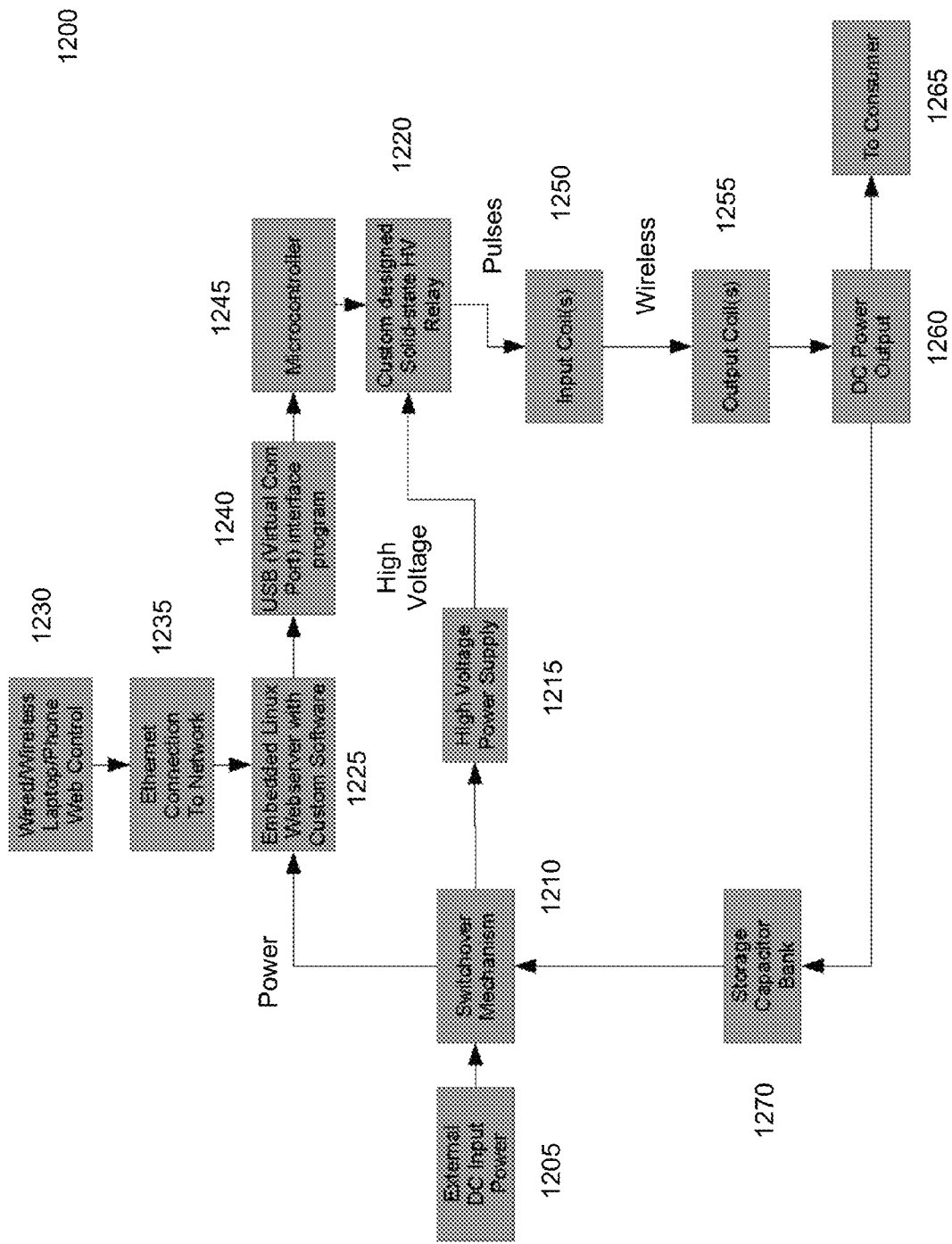
FIG. 12 is a block diagram of a system according to various embodiments of the present invention.

FIG. 12 is a block diagram of a system according to various embodiments of the present invention. External DC power 1205 (e.g., a battery or DC converter connected to AC power) can be used to provide power to a high voltage power supply 1215. A switchover mechanism 1210 can be placed between DC input power 1205 and HV power supply 1215, also called a power supply circuit. Switchover mechanism 1210 can also be connected to a storage capacitor bank 1270, and be used to determine whether power is sent to HV power supply 1215 from either DC input power 1205 or capacitor bank 1270. Various circuits, as shown, can be communicably coupled to each other.

The HV power supply 1215 (e.g., a step-up converter) can increase the voltage from DC input power 1205, and provide the high voltage to a relay (switching) mechanism 1220, labeled as solid-state HV relay. Switching mechanism 1220 can control when HV power supply 1215 is connected to input coil 1250. Thus, HV power supply 1215 is selectably connected to input coil 1250. Switching mechanism 1220 can include a custom high slew-rate PCB switch, with a metal-oxide-semiconductor field-effect transistor (MOSFET) and/or IGBT.

Switching mechanism 1220 can be controlled by a controller 1245, which in turn can be controlled by a Web server 1225 that connects to controller 1245 via USB interface 1240. Switching mechanism 1220 can be configured to connect and disconnect input coil 1250 to the power supply circuit. Controller 1245 can send signals to switching mechanism 1220 to control a connection state of switching mechanism 1220. The signals can be of any suitable form, e.g., periodic, non-periodic, etc. In one embodiment, a user's computer 1230 (e.g., a laptop or phone) can use our network connection 1235 to connect to Web server 1225 to provide instructions for configuring controller 1245, which can be set such that switching mechanism 1220 provides the desired voltage pulses.

Controller 1245 can be on a separate ground from the high voltage circuit (i.e., switching mechanism 1220 and inputs coil 1250). Controller 1245 can have an opto-electronic connection to switching mechanism 1220 so as to electrically isolate controller 1245 from the high voltage circuits of

1215 and 1220. Controller 1245 would normally operate on 5, 10, 12, or 15 volts, whereas the high voltage circuits of 1215 and 1220 can operate on 50 V, 100 V, or more (e.g., 4,000 V).

In one implementation, switchover mechanism 1210 can provide power to Web server 1225. Data can be transmitted between elements 1225-1245. Pulses are provided from switching mechanism 1220 and input conductor 1250 (e.g., an input coil). The pulses can create a divergent magnetic vector potential and a resulting electric field (which may be a directional electric field from an end of a coil) that induces a current in output conductor 1255 (e.g., an output coil). Thus, the connection between input coil 1250 and output coil 1255 is wireless. As input coil 1250 does not directly generate a significant magnetic field, additional power is not required to overcome any opposing induced current that would result from such a magnetic field.

DC power output 1260 can be obtained from the current in output coil 1255. DC power output 1260 can be provided to a consumer 1265, or more specifically to a consumer device to operate the consumer device. Any excess power can be saved in capacitor bank 1270, which can be used to replace or supplement DC input power 1205 for operating HV power supply 1215. Switchover mechanism 1210 can monitor (e.g., with a processor) the voltage from capacitor bank 1270, and switch the supply power from DC input power 1205 to capacitor bank 1270 when sufficient energy is stored in capacitor bank 1270.

B. Parameters

System 1200 can have various settings, e.g., as described herein. The settings can be designed to maximize the dI/dt for pulses to input coil 1250, minimize rise time for pulses to input coil 1250, and minimize the current I within input coil 1250. As for voltage, it is generally better to have higher voltage to increase dI/dt. In various embodiments, HV power supply 1215 can provide voltage pulses of at least 50 V (e.g., for communications) and at least 150 V (e.g., charging and higher). In one embodiment, HV power supply 1215 can produce at least 1 kV, where the wattage is less critical.

As for switching by relays 1220, the faster the rise time and fall time of the applied voltage to the wire the better as this allows the utilization of the generated dI/dt while minimizing I. In one implementation, a maximum pulse width is 1 μs (or other values mentioned herein) and the rise time is less than 30 ns.

The inductance of input conductor 1250 can depend on circuit elements (e.g., coil geometry and conductor material) and applied voltage pulse, as described above. A higher inductance can help to limit I, while a lower inductance can help to maximize dI/dt. A balance can be achieved to identify suitable inductance. A resistance of the wire similarly depends on circuit elements, where a higher resistance can help to limit I. Each of the elements described above can be optimized in order to make use of the divergent skin effect. In one aspect, no ferromagnetic materials are used in and about the coils.

C. Control Circuitry

Control circuitry (e.g., controller 1245 and other elements such as 1225 and 1230) can create the pulses with a specific frequency (pulse rate) and pulse width (which may be independent per output). In various embodiments, the pulse rate can be equal to or greater than 1 kHz, 100 kHz, 500 kHz, 1 MHz, 1 GHz, or higher The pulse rate of the series of input voltage pulses can provide a desired frequency for the time-varying magnetic vector potential.

In devices consisting of more than one coil, the control circuitry can control the phase between pulses to the input coils, i.e., pulses coming out are at the same frequency but different phase with respect to pulses for a different well. For example, if three input coils are used, a phase can be set at 120 degrees, with all the coils operating at the same frequency. In one implementation, the pulse width can be independently changed per pulse.

D. Switching Circuitry

Switching mechanism 1220 can control the rise time and the fall time of the voltage pulse. The rise time can be faster when the switch can close faster. The exact form for the rising edge (e.g., slope, curvature, and exponential increase) can depend on the materials and configuration of the switching devices involved. The falling edge would have a certain decay shape. Once the switch is completely open (i.e., circuit is separated from the power supply), the voltage would be effectively zero in the circuit. Example switching circuitry can be found in concurrently filed U.S. Nonprovisional application entitled "Using Skin Effect To Produce A Magnetic Vector Potential For Inducing A Voltage." Additional description of nanosecond pulse generators can be found in U.S. Pat. No. 8,120,207, which is incorporated by reference for all purposes.

E. Example Device

In one embodiment, a system comprises a 20 kV DC power supply, a polyethylene-based high power pulse capacitor bank rated at 0.119 uF @ 30 kV+, and an asymmetric switch. The system feeds a 28 AWG copper coil varying voltage levels up to 20 kV at varying pulse rates (cycles) per second. This enables the production of a radially produced electric field from the coil. To pulse the input coils with a fast 'slew rate' for the applied voltage or ∂V/∂t and to direct large quantities of switched pulses into varying numbers of input coils, a 6-channel, 1.5 kV solid state control system was designed. The coil can use varying gauges, e.g., down to 40 AWG.

In one implementation, the 0.119 uF capacitor bank includes pulsed power polyethylene capacitors with bleed-resistors. A switching mechanism can include a custom high slew-rate PCB switch, with a metal-oxide-semiconductor field-effect transistor (MOSFET) and/or IGBT.

VII. Example Results

Figure 13A:
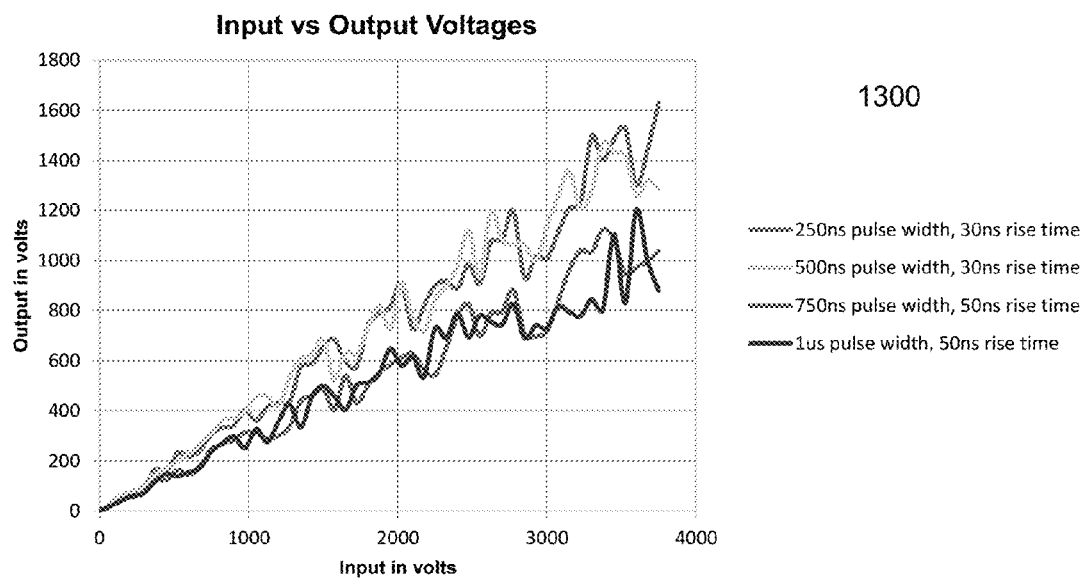
FIGS. 13A and 13B show plots of the amplitude of an input voltage pulse on an input conductor vs. the amplitude of an output voltage pulse induced in an output circuit for various pulse widths and rise times according to embodiments of the present invention.
Figure 13B:
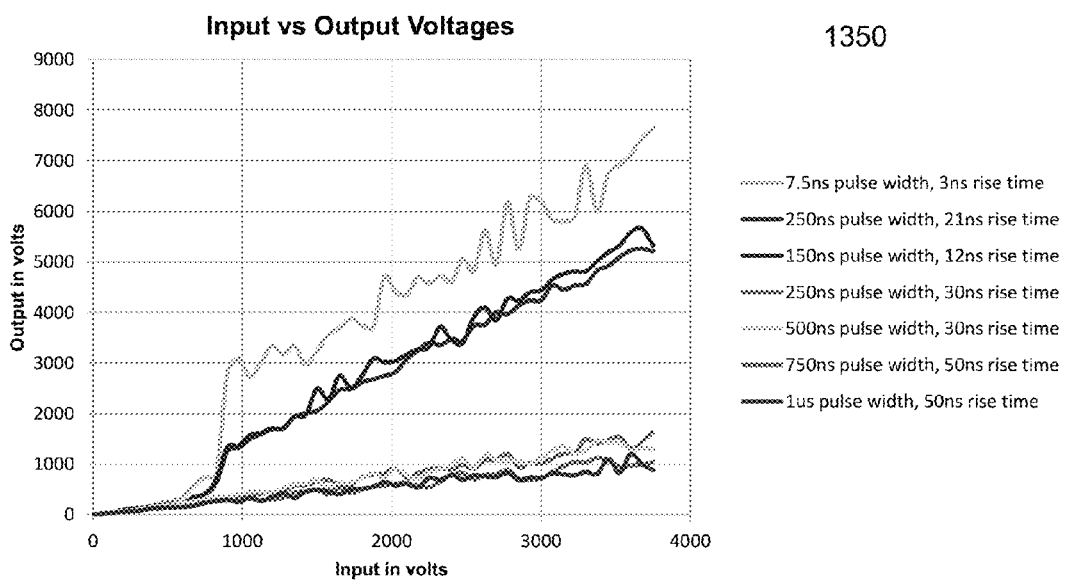

FIGS. 13A and 13B show plots of the amplitude of an input voltage pulse on an input conductor vs. the amplitude of an output voltage pulse induced in an output circuit for various pulse widths and rise times according to embodiments of the present invention. The voltages are the maximum voltage (amplitude) of the pulses. The input voltage pulses have widths that range from 1 μs to 7.5 ns, and the rise times range from 50 ns to 3 ns. FIGS. 13A and 13B show plots in different scales. A pulse rate of 1 kHz was used.

The plots are obtained for an input solenoid coil that has an axis that is parallel to an output solenoid coil. Thus, an AC current in the input coil would induce an appreciable current in the output coil since the axes of the solenoids are parallel to each other. In this geometrical configuration, there would be back coupling between the two coils if there was appreciable current. In terms of the self-induction (Lenz effect), the pulses are short enough that the amount of current along the input coil does not become large enough to have an appreciable Lenz effect, at least from the pulses, although there can be current from back coupling between the two coils.

FIG. 13A shows a plot 1300 of input vs. output voltages for rise times of 30 ns and 50 ns. As one can see, the output voltage does increase with input voltage. But, since the pulses are of short duration, no appreciable amount of current flows in the input coil from the pulses. Thus, the input voltage pulses are not creating appreciable current because of their short duration. Instead, the output voltage is being induced by the electric field resulting from the capacitive effects of the input coil.

FIG. 13B shows a plot 1350 of input vs. output voltages for rise times from 50 ns to 3 ns. The output voltages for rise times of 21 ns, 12 ns, and 3 ns are much larger than the output voltages for rise times 50 ns and 30 ns. It is a surprising result that the output voltage becomes much larger for less than 30 ns. Thus, when operating with pulses of less than 30 ns, one can induce a much larger output voltage that can be used for charging or communications in the output coil. And, due to the short pulses, the Lenz effect is reduced, while still allowing induction to occur. The jagged behavior in the curves is just due to noise, as the measurements can be sensitive to the environment.

FIG. 14 shows a table 1400 of the data points used to create plots 1300 and 1350 according to embodiments of the present invention. As one can see, the output voltage jumps from rise times of 30 ns to rise time of 21 ns, even when the pulse width stays the same (e.g., at 250 ns width). The jump in induced output voltage for rise times less than 30 ns occurs even with an input voltage of 1 V. There are also jumps when varying voltage for a given rise time, e.g., between 600 V and 675 V and between 825 V and 900 V.

The pulse width does not appreciably affect the induced voltage in the output circuit, at least not compared to the rise time. The pulse width can remain small so that power is not wasted by generating appreciable current in the input circuit from the input pulses, e.g., since that current is not being used to generate the output voltage due to the coil geometry. The output voltage is shown to increase for a smaller rise time. A smaller rise time creates a higher dI/dt as there is a higher dV/dt, which causes a higher $$\frac{\partial \vec{A}}{\partial t}.$$

Further, with smaller rise times and pulse widths, the lower the ultimate power used for the input voltages, because if the input pulse gets to the top quicker then the pulses can be dropped sooner. As an appreciable increase in the output voltage is seen, the effects for pulses with rise times less than 30 ns can be attributed to the longitudinal magnetic vector potential A, since a magnetic field is not generated as a direct result of the pulses.

As to inducing output pulses in the output circuit with such short input pulses, the pulse rate can increase depending on the charging and power needs, e.g., depending on rise times and induced output voltages. For communications, the faster rise times can provide for communications at longer distances due to the higher electric field.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. An apparatus comprising:
   an input coil comprising a plurality of windings of a conductor, the input coil having a first end that is separated from a second end;
   a power supply circuit selectably connected to the input coil, the power supply circuit configured to provide a direct current (DC) voltage, wherein the power supply circuit includes a diode in parallel with the input coil and an inductor in series with the input coil;
   a switching mechanism coupled between the power supply circuit and the input coil and configured to connect and disconnect the input coil to the power supply circuit, thereby causing the diode to store charges in a depletion layer when a forward current exists and to rapidly switch open after the depletion layer is discharged by a reverse current such that an input voltage pulse is provided from the inductor to the input coil;
   a controller on a separate ground from the power supply circuit and communicably coupled with the switching mechanism for controlling a connection state of the switching mechanism, wherein the controller is configured to control the switching mechanism such that the power supply circuit provides a series of input voltage pulses to the input coil, thereby creating a directional electric field from the first end of the input coil; and
   an output conductor positioned to receive the directional electric field.

2. The apparatus of claim 1, wherein the input coil is a cylindrical solenoid, and wherein the directional electric field is along an axis of the cylindrical solenoid.

3. The apparatus of claim 1, wherein the output conductor comprises an output wire that is parallel to an axis of the input coil at the first end.

4. The apparatus of claim 3, wherein the output wire is at least partially within the input coil.

5. The apparatus of claim 1, wherein the output conductor comprises an output coil that has a first axis aligned with a second axis of the input coil.

6. The apparatus of claim 1, further comprising:
   a load electrically coupled with the output conductor.

7. The apparatus of claim 1, wherein each input voltage pulse has a rise time of less than 30 nanoseconds and has an amplitude of at least 1 volt.

8. The apparatus of claim 7, wherein each input voltage pulse has an amplitude of at least 900 volts.

9. The apparatus of claim 7, wherein the series of input voltage pulses creates a time-varying magnetic vector potential from the first end of the input coil, and wherein the time-varying magnetic vector potential forms a longitudinal wave.

10. The apparatus of claim 1, wherein each input voltage pulse has a slew rate of more than 10 V volts per nanosecond.

11. The apparatus of claim 1, wherein each input voltage pulse has a pulse width of 100 microseconds or less.

12. The apparatus of claim 11, wherein each input voltage pulse has a pulse width of 1 microsecond or less.

13. The apparatus of claim 1, wherein the controller is configured to provide signals to the switching mechanism to control the connection state of the switching mechanism, and wherein the signals are periodic.

14. The apparatus of claim 13, wherein a duty cycle of the series of input voltage pulses is less than 1%.

15. The apparatus of claim 1, wherein the controller is configured to provide signals to the switching mechanism to control the connection state of the switching mechanism, and wherein the signals are not periodic.

16. The apparatus of claim 1, wherein the switching mechanism includes a solid-state switch, and wherein the solid-state switch includes at least one of a MOSFET or an IGBT.

17. A method of generating a directional electric field from a first end of an input coil using a power supply circuit selectably connected to the input coil, the method comprising:

providing a direct current (DC) voltage with the power circuit, wherein the power supply circuit includes a diode in parallel with the input coil and an inductor in series with the input coil selectably connecting the power supply circuit to the input coil using a switching mechanism such that an input voltage pulse is provided to the input coil, where the switching mechanism is configured to connect and disconnect the input coil to the power supply circuit, thereby causing the diode to store charges in a depletion layer when a forward current exists and to rapidly switch open after the depletion layer is discharged by a reverse current such that an input voltage pulse is provided from the inductor to the input coil;

providing, with the power supply circuit, a series of input voltage pulses to the input coil, thereby creating the directional electric field from the first end of the input coil, the first end being separated from a second end of the input coil;

using a controller to control a connection state of the switching mechanism to generate the series of input voltage pulses; and receiving the directional electric field at an output conductor that includes a load.

18. The method of claim 17, further comprising:

driving the load at least partially with a current resulting from the directional electric field.

19. The method of claim 17, wherein the input coil is a cylindrical solenoid, and wherein the directional electric field is along an axis of the cylindrical solenoid.

20. The method of claim 17, wherein the output conductor comprises an output wire that is parallel to an axis of the input coil at the first end.

21. The method of claim 20, wherein the output wire is at least partially within the input coil.

22. The method of claim 17, wherein the output conductor comprises an output coil that has a first axis aligned with a second axis of the input coil.

23. The method of claim 17, wherein each input voltage pulse has a pulse width of 100 microseconds or less.

24. The method of claim 23, wherein each input voltage pulse has a pulse width of 1 microsecond or less.

25. The method of claim 17, wherein the controller provides signals to the switching mechanism to control the connection state of the switching mechanism, and wherein the signals are periodic.

26. The method of claim 17, wherein the controller provides signals to the switching mechanism to control the connection state of the switching mechanism, and wherein the signals are not periodic.

27. The method of claim 17, wherein each input voltage pulse has a rise time of less than 30 nanoseconds and has an amplitude of at least 1 volt.

28. The method of claim 27, wherein each input voltage pulse has an amplitude of at least 900 volts.

29. The method of claim 27, wherein the series of input voltage pulses creates a time-varying magnetic vector potential from the first end of the input coil, and wherein the time-varying magnetic vector potential forms a longitudinal wave.

* * * * *